(12) United States Patent
Price et al.

(10) Patent No.: US 12,716,870 B2
(45) Date of Patent: Aug. 25, 2026

(54) EFFICIENT BEAM PROFILE IMAGING FOR NON-NEGLIGIBLE WAVE PROPERTIES AND ROTATIONALLY ANISOTROPIC GEOMETRIES

(71) Applicant: Halliburton Energy Services, Inc., Houston, TX (US)

(72) Inventors: James Martin Price, Houston, TX (US); Christopher Michael Jones, Houston, TX (US); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 634 days.

(21) Appl. No.: 17/669,670

(22) Filed: Feb. 11, 2022

(65) Prior Publication Data

US 2023/0314379 A1 Oct. 5, 2023

(51) Int. Cl.
*G01N 29/04* (2006.01)
*G01N 29/07* (2006.01)

(52) U.S. Cl.
CPC ......... *G01N 29/043* (2013.01); *G01N 29/075* (2013.01)

(58) Field of Classification Search
CPC ............... G01N 29/043; G01N 29/075; G01N 29/4436; G01V 1/284; G01V 1/50; E21B 47/005
See application file for complete search history.

(56) References Cited

U.S. PATENT DOCUMENTS 4,839,869 A 6/1989 Corcoran
5,587,942 A 12/1996 Krebs
5,629,905 A 5/1997 Au
6,002,642 A 12/1999 Krebs
6,269,310 B1 7/2001 Washbourne
(Continued)

FOREIGN PATENT DOCUMENTS

CN 101256234 A * 9/2008
CN 209495671 U * 10/2019
CN 113040826 6/2021

OTHER PUBLICATIONS

International Search Report and Written Opinion for Application No. PCT/US2022/016283, dated Nov. 8, 2022.
(Continued)

*Primary Examiner* — Catherine T. Rastovski
*Assistant Examiner* — Sharah Zaab
(74) *Attorney, Agent, or Firm* — Benjamin Ford; C. Tumey Law Group PLLC

(57) ABSTRACT

Systems and methods for beam profile imaging by emitting a ray into one or more media; receiving a first signal corresponding to the ray at a first point; encoding a first matrix based at least in part on one or more of a location of the first point, a direction of the ray at the first point, and a first perturbation effect; receiving a second signal corresponding to the ray at a second point; encoding a second matrix based at least in part on one or more of a location of the second point, a direction of the ray at the second point, and a second perturbation effect; and calculating the value of the acoustic property of one or more media based at least in part on a comparison between the first matrix and the second matrix.

20 Claims, 9 Drawing Sheets

(56) References Cited

U.S. PATENT DOCUMENTS

| | | | | |
|---|---|---|---|---|
| 2012/0309116 | A1 * | 12/2012 | Colgan | G01N 29/2418<br>257/E21.525 |
| 2013/0204137 | A1 * | 8/2013 | Roy | A61B 8/0825<br>600/448 |
| 2016/0216393 | A1 * | 7/2016 | Zhou | E21B 47/0025 |
| 2019/0247050 | A1 * | 8/2019 | Goldsmith | A61F 2/82 |
| 2020/0025720 | A1 * | 1/2020 | Quaegebeur | G01N 29/27 |
| 2022/0105739 | A1 * | 4/2022 | Silbert | B41J 11/46 |

OTHER PUBLICATIONS

Author Unknown, "Part 3 Reflection and Transmission of Ultrasonic Waves," (2004), 27 pages, last accessed on Feb. 11, 2022 at http://www.fast.u-psud.fr/~martin/acoustique/support/r%C3%A9flection-r%C3%A9fraction.pdf.

* cited by examiner

EFFICIENT BEAM PROFILE IMAGING FOR NON-NEGLIGIBLE WAVE PROPERTIES AND ROTATIONALLY ANISOTROPIC GEOMETRIES

FIELD OF THE INVENTION

The present disclosure relates to a system and methods for efficient beam profile imaging for non-negligible wave properties and rotationally anisotropic geometries, and more specifically to applying an enhanced form of raytracing to high-wavelength applications (including but not limited to acoustic and ultrasonic applications) and rotationally anisotropic geometries by accounting for wave phenomena and geometric abnormalities like wave mode coupling, compressional wave to shear wave coupling, phase, constructive interference, destructive interference, detector eccentricity, variations in the thickness of one or more media, and some types of dispersion.

BACKGROUND

The traditional three-dimensional (3-D) simulation approach to beam profile imaging used to determine the properties of rotationally anisotropic targets is often computationally unreasonable. In the traditional 3-D simulation approach, a simulation of a single point may take 30 minutes on a computer cluster with 200 nodes at 1.8 GHz. Simplifying assumptions may improve the efficiency of modeling to enable calculation of a point every 10 minutes on a cluster with 200 nodes at 1.8 GHz but may also degrade the treatment by omitting necessary information through oversimplification. It is common for data logging systems to record acoustic properties at 240 points or more per second. It is common for each logged well to require processing of 500,000 data points. Processing these data points, which may involve inverting each data point by forward modeling, may further require multiple iterations. Accordingly, a full 3-D finite element inversion by forward modeling is often impractical; even large cloud clusters are typically incapable of modelling these problems within reasonable time periods and are certainly incapable of producing real-time results. One-dimensional (1-D) models may be calculated more quickly, but they often fail to account for geometric abnormalities (for example, rotational anisotropy) and adopt several simplifying assumptions (e.g., planar wavefront, homogenous media, normal angle of incidence, etc.) that deviate from the actual situation.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1:
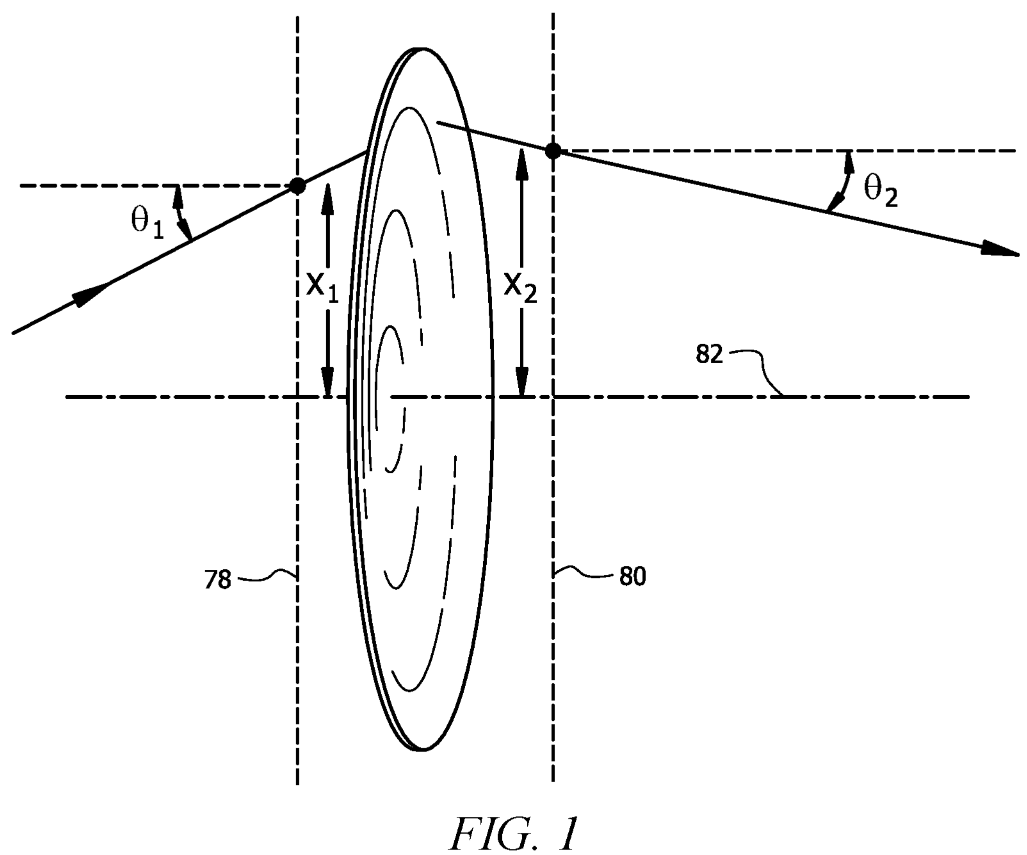
FIG. 1 depicts a simplified exemplary diagram of a ray propagating toward a curved target, according to one or more aspects of the present disclosure.

While embodiments of this disclosure have been depicted and described and are defined by reference to exemplary embodiments of the disclosure, such references do not imply a limitation on the disclosure and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only and are not exhaustive of the scope of the disclosure.

DETAILED DESCRIPTION

The present disclosure relates to a system and methods for efficient beam profile imaging for non-negligible wave properties and rotationally anisotropic geometries, and more specifically to applying an enhanced form of raytracing to high-wavelength applications (including but not limited to acoustic and ultrasonic applications) and rotationally anisotropic geometries by accounting for wave phenomena and geometric abnormalities like wave mode coupling, compressional wave to shear wave coupling, phase, constructive interference, destructive interference, detector eccentricity, variations in the thickness of one or more media (for example and without limitation, casing thickness), and some types of dispersion.

Disclosed herein is a solution that enables rapid determination of an acoustic property of one or more media (for example and without limitation, one or more of acoustic impedance, signal attenuation, or the speed of sound in the one or more media), which may be used to computationally determine (1) the medium's material, and (2) the medium's integrity. One solution to the efficiency challenges facing beam profile imaging of rotationally anisotropic geometries is to use geometrical raytracing. The computational efficiency and parallelization of raytracing solutions are highly desirable, as they make real-time solutions attainable. This attainability is furthered by the fact that GPU processors are widely available and were designed to compute complex raytracing problems. Raytracing solutions allow 3-D acoustic or ultrasonic problems to be solved in real time—in other words, often in milliseconds and in no more than ten seconds-using one or more GPU processors. However, raytracing assumptions are commonly made in optical-wave raytracing applications because the wavelengths of optical waves are much smaller than the medium of propagation; the longer wavelengths of acoustic and ultrasonic waves cause raytracing assumptions to break down, and strictly raytracing is not appropriate. A similar issue exists for rotational anisotropy, for example and without limitation, detector eccentricity and variations in material thickness, for example and without limitation, casing thickness. Raytracing models adopt several simplifying assumptions (for example and without limitation, that the wavefront is planar, that the medium is homogenous, that the angle of incidence is normal, or that the angle of incidence is sufficiently small (that is, small angle approximation)) that deviate from the actual situation; thus, geometric abnormalities like rotational anisotropy may cause raytracing models to produce inaccurate results. Such assumptions cannot account for wave phenomena or geometric abnormalities such as wave mode coupling, compressional wave to shear wave coupling, phase, constructive interference, destructive interference, dispersion, detector eccentricity, and variations in the thickness of one or more media. To account for wavelengths longer than those of visible light and for geometric abnormalities, an enhanced form of raytracing is disclosed. One or more embodiments of the present disclosure may be used to achieve one or more of fast forward modeling, real-time inversion of acoustic and ultrasonic properties, and real-time calculation of acoustic and ultrasonic properties with respect to 3-D effects.

The present disclosure discloses a new method of enhanced raytracing to enable analysis of one or more material properties through the use of any type of wave and in rotationally anisotropic geometric scenarios. To do so, wave properties and geometric abnormalities like energy magnitude, phase information, mode coupling (for example and without limitation, shear coupling), reflectivity, variations in material thickness, material diameter and/or curvature, material distance, and detector eccentricity may be encoded into transfer matrices. In certain embodiments, the geometrically abnormal material may be an oilwell casing. At each evaluation point, a matrix composition calculation may be performed, and the encoded information may be evaluated and adjusted. In traditional raytracing, only the position and direction are updated at the evaluation point; here, the position, direction, and any encoded properties may be updated. This reintegration may occur at each solid interface (for example, the side of a casing), but it may also occur at points throughout the propagation medium.

One or more different models may be used to update the direction and encoded properties at the evaluation point. For example and without limitation, the average of the rays' relevant encoded property may be used in a simple model. In more practical embodiments, assumptions may be made, for example and without limitation regarding distance and form, to create a more robust model. For example, in one or more embodiments, the model could assume that distant rays interact less than proximate waves. Analytical forms and machine learning algorithms are two exemplary embodiments.

In one or more aspects of the present disclosure, this technology may be useful in the oil and gas industry in the processing of waves, including and without limitation acoustic, ultrasonic, and electromagnetic waves that may be one or more of produced or captured by one or more down-well tools. Furthermore, in one or more aspects, this technology may be useful to support one or more of pre-job planning, real time inversion, or sensor design. The technology may be useful for any optics application in which raytracing would be useful but may be impeded by traditional assumptions (for example and without limitation, in applications that may be best measured via waves with longer wavelengths than those of visible light or in applications with rotationally anisotropic geometries). Potential uses may include but are not limited to applications involving optical, x-ray, ion, or electron beams, among many others. The disclosed methods may be used alone or in conjunction with finite difference simulation.

In one or more aspects of the present disclosure, an information handling system may be utilized to control one or more operations. For purposes of this disclosure, an information handling system may comprise any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may comprise random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a sequential access storage device (for example, a tape drive), direct access storage device (for example, a hard disk drive or floppy disk drive), compact disk (CD), CD read-only memory (ROM) or CD-ROM, DVD, RAM, ROM, electrically erasable programmable read-only memory (EEPROM), and/or flash memory, biological memory, molecular or deoxyribonucleic acid (DNA) memory as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "la" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subsurface formation. Embodiments may be applicable to injection wells, and production wells, including natural resource production wells such as hydrogen sulfide, hydrocarbons or geothermal wells; as well as wellbore or borehole construction for river crossing tunneling and other such tunneling wellbores for near surface construction purposes or wellbore u-tube pipelines used for the transportation of fluids such as hydrocarbons. Embodiments described below with respect to one implementation are not intended to be limiting.

FIG. 1 depicts a simplified exemplary diagram of a ray propagating toward a curved target, according to one or more aspects of the present disclosure. In one or more embodiments, a ray 81 may refract off an input plane 78 of a curved target, transmit through the target, and refract off an output plane 80. The dashed horizontal line in the center of the figure represents the optical axis. $X_i$ represents the ray's initial displacement, $X_f$ represents the ray's final displacement, $\theta_i$ represents the ray's initial angle with respect to the optical axis, and $\theta_f$ represents the ray's final angle with respect to the optical axis.

In one or more embodiments, a ray tracing formalism may relate the initial state of a paraxial ray to its final state (that is, its state after propagating through any combination of reflective and refractive elements). One such ray tracing formalism is provided below:

$$\begin{pmatrix} x_f \\ \theta_f \end{pmatrix} = M^* \begin{pmatrix} x_i \\ \theta_i \end{pmatrix}$$

Wherein M* represents the composition of transfer matrices for each element along the ray path, $x_i$ represents the ray's initial displacement, $x_f$ represents the ray's final displacement, $\theta_i$ represents the ray's initial angle with respect to the optical axis, and $\theta_f$ represents the ray's final angle with respect to the optical axis. Within the first echo geometry, the ray propagates a distance from the source to the curved target, is reflected, and propagates back to the source. Accordingly, the ray's path may be described by a composition of three transfer matrices: (1) propagation, (2) reflection from a spherical concave mirror, and (3) propagation. The first and third transfer matrices (that is, the propagation matrices) should be identical. These propagation matrices and the reflection matrix are provided below:

The ray transfer matrix for a propagation of distance, d, parallel to the optical axis is:

$$M_d = \begin{vmatrix} 1 & d \\ 0 & 1 \end{vmatrix}$$

The ray transfer matrix for reflection from a concave spherical mirror, with radius of curvature, R, is:

$$M_R = \begin{vmatrix} 1 & 0 \\ \frac{-2}{R} & 1 \end{vmatrix}$$

Combining these matrices and tracing out the optical path for a first echo, the effective transfer matrix is:

$$M^* = \begin{vmatrix} 1 & d \\ 0 & 1 \end{vmatrix} * \begin{vmatrix} 1 & 0 \\ \frac{-2}{R} & 1 \end{vmatrix} * \begin{vmatrix} 1 & d \\ 0 & 1 \end{vmatrix}$$

$$M^* = \begin{vmatrix} 1 - \frac{2d}{R} & 2d - \frac{2d^2}{R} \\ \frac{-2}{R} & 1 - \frac{2d}{R} \end{vmatrix}$$

In one or more embodiments, this result may be replicated in commercial ray tracing software suites like Zemax for situations in which rotational invariance is preserved. This result is consistent with the plane wave 1-D model and will converge in the limiting case, $$\lim_{R \to \infty} M^*,$$

where the initial conditions match the final conditions and Snell's law for reflection holds:

$$x_f = x_i + 2d\theta_i,$$

$$\theta_f = \theta_i.$$

This result is also consistent with an azimuthally invariant system, such as the case for a perfectly centered source. An azimuthally invariant system may be represented by the limiting case, $$\lim_{xi \to 0} M^*,$$

where there is no displacement from the optical axis. As such, the results for azimuthally invariant systems only depend on non-normal initial incidence angles. The results for azimuthally invariant systems match the initial conditions for normal incidence reflections, represented mathematically below:

$$x_f = \theta_i(2d - 2d^2 / R),$$
$$\theta_f = \theta_i(1 - 2d / R)$$

The spatial term, $$\frac{\partial x_f}{\partial x_i},$$

and angular magnification term, $$\frac{\partial \theta_f}{\partial \theta_i},$$

scale by (1−2d/R), acting as a type of self-focusing effect. This is a result not accessible from the 1-D plane wave model. It cannot be simulated with commercial reflectivity software (for example and without limitation, JA Woollam). If 2d/R>1, the final condition is deflected away from the optical axis. If 2d/R<1, the final condition is deflected toward the optical axis. If 2d=R, a resonance occurs in focusing on the optical axis.

The 2d=R focusing effect may be calculated and illustrated for various geometrical conditions. The propagation distance, d, may be calculated using what is known in the art as "the cosine rule" and is proportional to cosφ:

$$d = -x_i\cos\emptyset + \sqrt{x_i^2\cos\emptyset^2 + R^2 - x_i^2}$$

Figure 2A:
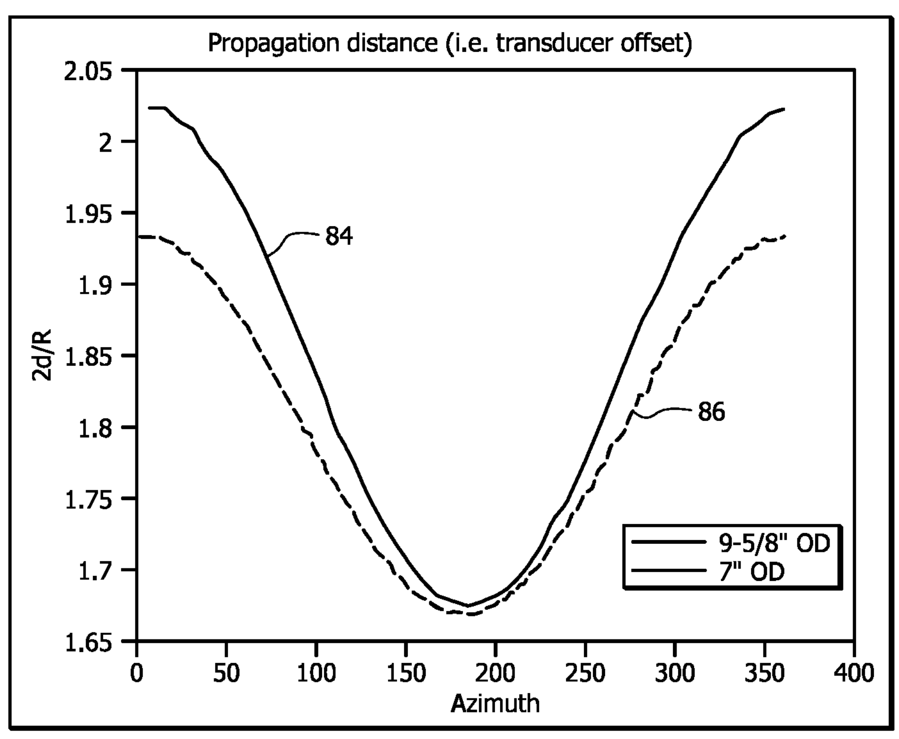
FIG. 2A depicts an exemplary graph of a ray's propagation distance plotted against various azimuthal angles for casings with various outer diameters, according to one or more aspects of the present disclosure.

FIG. 2A depicts an exemplary graph of a ray's propagation distance plotted against various azimuthal angles for casings with various outer diameters, according to one or more aspects of the present disclosure. The propagation distance referenced at the end of FIG. 1's description (that is, $d=-x_i \cos\emptyset+\sqrt{x_i^2\cos\emptyset^2+R^2-x_i^2}$) is also the transducer offset. It is plotted for both 9.625-inch outer diameter casing conditions and 7-inch outer diameter casing conditions. The curve of the propagation distance plotted against the azimuthal angle for a 9.625-inch outer diameter casing is represented by element 84. The curve of the propagation distance plotted against the azimuthal angle for a 7-inch outer diameter casing is represented by element 86. Though FIG. 2A depicts a graph of a ray's propagation distance plotted against various azimuthal angles for casings with various outer diameters, note that all media fall within the scope of the present disclosure; the casing-based embodiments disclosed herein are purely exemplary and non-limiting.

Figure 2B:
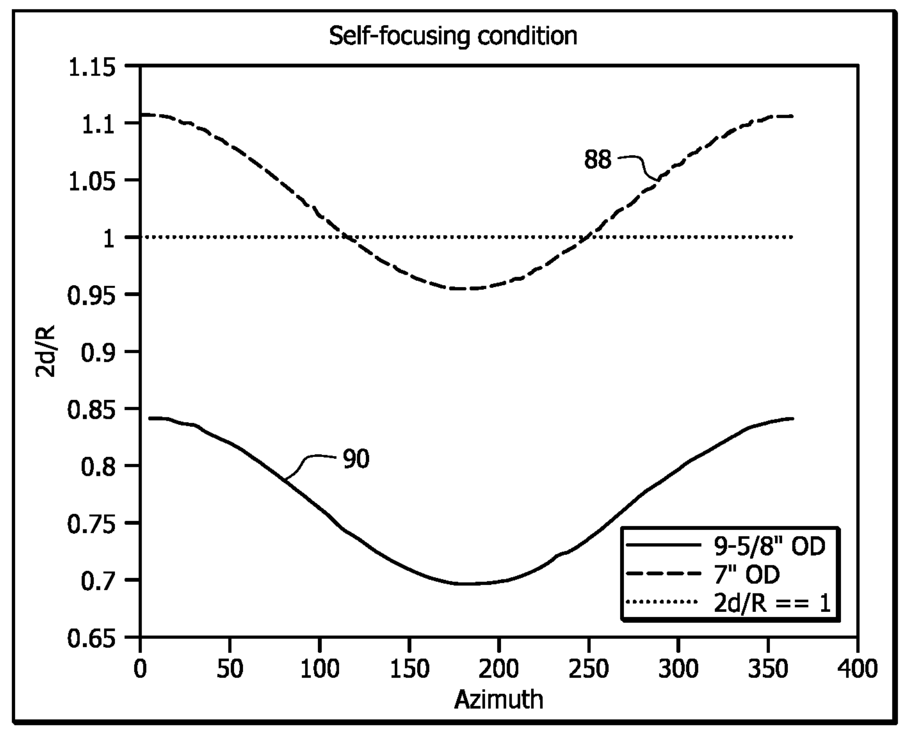
FIG. 2B depicts an exemplary graph of a ray's propagation distance in the ray's self-focusing condition plotted against various azimuthal angles for casings with various outer diameters, according to one or more aspects of the present disclosure.

FIG. 2B depicts an exemplary graph of a ray's propagation distance in its self-focusing condition plotted against various azimuthal angles for casings with various outer diameters, according to one or more aspects of the present disclosure. The self-focusing condition discussed in FIG. 1's description (that is, 2d/R) is plotted for both 2d/R>1 and 2d/R<1. The curve of the propagation distance plotted against the azimuthal angle for a 9.625-inch outer diameter casing for the self-focusing condition is represented by element 90. For the 9.625-inch outer diameter casing curve 90, 2d/R is always less than one, resulting in focusing on the optical axis for any azimuthal angle. The curve of the propagation distance plotted against the azimuthal angle for a 7-inch outer diameter casing for the self-focusing condition is represented by element 88. For the 7-inch outer diameter casing curve 88, the curve oscillates above and below the self-focusing condition (that is, 2d/R is sometimes greater than one, sometimes less than one, and sometimes equal to one) depending on the azimuthal angle. The horizontal dashed line represents the resonance condition, 2d/R=1. Those skilled in the art may notice that the angular magnification in FIG. 2B is asymmetrical; this asymmetry is discussed in more detail in FIG. 3's detailed description. Though FIG. 2B depicts a graph of a ray's propagation distance plotted against various azimuthal angles for casings with various outer diameters, note that all media fall within the scope of the present disclosure; the casing-based embodiments disclosed herein are purely exemplary and non-limiting.

Figure 3:
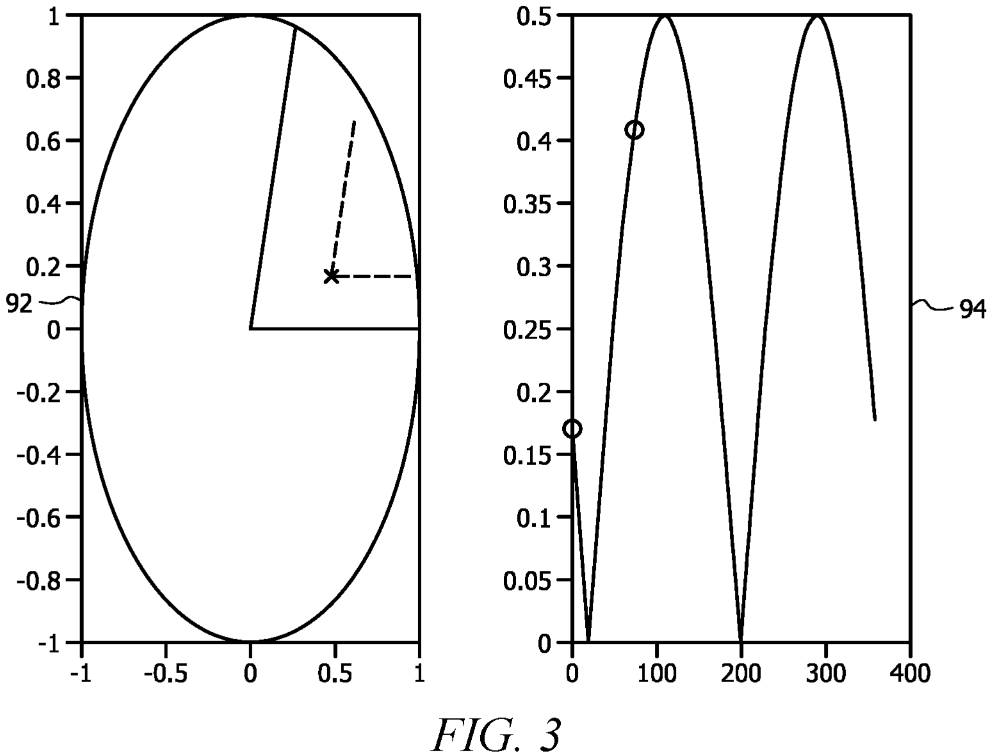
FIG. 3 depicts two exemplary graphs, according to one or more aspects of the present disclosure; the left graph plots the change of position of an eccentric source with respect to the optical axis for various angles, and the right graph plots the difference between the source normal axis and the optical axis as a function of azimuthal angle.

FIG. 3 depicts two exemplary graphs, according to one or more aspects of the present disclosure; the left graph plots the change of position of an eccentric source with respect to the optical axis for various angles, and the right graph plots the difference between source normal axis and the optical axis as a function of azimuthal angle. The graph of the manner in which an eccentric source changes its position with respect to the optical axis for two angles (0 degrees and 75 degrees) is represented by element 92. The graph of the difference between the source normal axis and the optical axis as a function of azimuthal angle is represented by element 94.

In one or more embodiments, the ray transfer matrix formalism may assume rotational invariance by casting the formalism in one dimension with respect to the optical axis. The equations given in the description of FIG. 1 do not hold for the case when the source is rotated about its azimuthal axis and the initial ray vector (xi, θi) changes with respect to the optical axis. The results will be isotropic for all azimuthal angles only when the initial ray state is congruent with the optical axis. For the general case of systems with rotational anisotropy, wherein the source position with respect to the optical axis changes when rotated azimuthally, a composition of coordinate transformations may be performed prior to evaluating the final effective ray transfer matrix. In other words, the initial state for each ray vector may undergo a rotational coordinate transformation and distance coordinate transformation prior to evaluating the ray transfer matrix results. In the left graph 92, r=Radius/2 (where r is radius of curvature), and θ=20 degrees. The left graph 92 is represented in polar coordinates. The left graph 92 provides an illustrative example of how an eccentric source changes its position with respect to the optical axis for two angles, 0 degrees and 75 degrees. The right graph 94 plots the difference between source normal axis and the optical axis as a function of azimuthal angle.

The initial ray vector position, relative to the optical axis, may be determined by calculating the difference between the rotated source unit normal position and the curved target unit normal position as a function of azimuthal angle. For an eccentric source position with polar coordinates (r,α), the rotated unit normal position (X',Y') may be determined by a composition of translation (T) and rotational (R) coordinate transformations from the original position (X,Y):

$$P(x', y') = T(r\cos(\alpha), r\sin(\alpha)) * R(\phi) * T(-r\cos(\alpha), -r\sin(\alpha))$$

$$X' = X\cos\phi - Y\sin\phi + r\cos(\alpha) - r\cos(\alpha - \phi)$$

$$Y' = X\sin\phi + Y\cos\phi + r\sin(\alpha) - r\sin(\alpha - \phi)$$

wherein P is the newly translated cartesian position coordinate and φ is the rotated angle. Here, X and Y would represent the coordinates at the target parallel to the optical axis. If the angle, β, is defined to be the angle at the target parrel to the source, the following equations are true:

$$\beta = \sin^{-1}\left[\frac{r}{R}\sin\alpha\right]$$

$$X = R\cos\beta,\ Y = R\sin\beta,$$

The β and X equations above may be substituted into the X' and Y' equations to produce the following equations:

$$X' = \cos\phi\left(\sqrt{R^2 - r^2\sin\alpha^2} - r\cos\alpha\right) + r\cos\alpha$$

$$Y' = \sin\phi\left(\sqrt{R^2 - r^2\sin\alpha^2} - r\cos\alpha\right) + r\sin\alpha$$

The above equations represent two parallel lines with a slope equal to tanφ. The distance between two parallel lines, and the optical axis offset at the origin, is:

$$x_i = \frac{|Y' - X'\tan\phi|}{\sqrt{\tan\phi^2 + 1}} = |r\sin(\alpha - \phi)|$$

The $x_i$ equation above may be substituted into the ray transfer matrix results. Assuming normal incident rays are parallel to the optical axis, the following equations are true:

$$x_f = |r\sin(\alpha - \phi)| * \left(1 - \frac{2d}{R}\right)$$

$$\theta_f = \left(\frac{-2r}{R}\right)|\sin(\alpha - \phi)|$$

Figure 4:
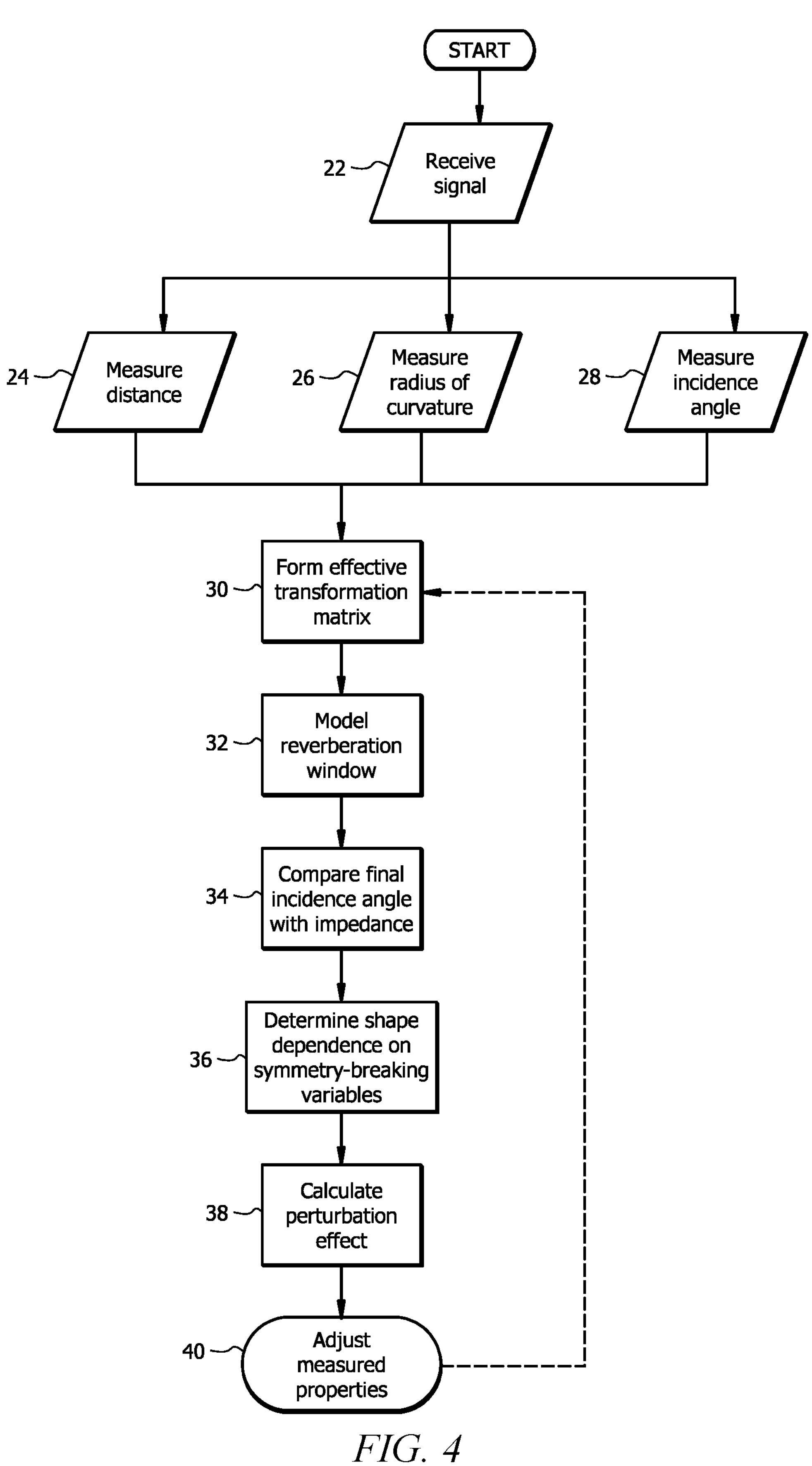
FIG. 4 depicts an exemplary flow diagram illustrating a forward inversion method for modeling ultrasonic or acoustic properties, according to one or more aspects of the present disclosure.

FIG. 4 depicts an exemplary flow diagram illustrating a forward inversion method for modeling ultrasonic or acoustic properties, according to one or more aspects of the present disclosure. First, an initial signal 22 may be received via any mechanism by which information may be received, remotely or otherwise. This initial signal is used to measure one or more data points, including and without limitation distance 24, radius of curvature 26, and incidence angle 28. The distance may be determined by multiplying the speed of sound by the round-trip time of a signal. The radius of curvature is typically known or measured at the surface. The incidence angle, relative to surface normal, may be calculated from the geometrical relation of the source and receiver position with respect to the surface. The data points may then be used to form an effective transformation matrix 30. In one or more embodiments, the final incidence angle curve and impedance curve 34 may be modeled in a reverberation window 32 and may be visually represented by one or more graphs. In one or more embodiments, these graphs may be similar to FIGS. 8 and 9. The reverberation window 32 may then be analyzed, either automatically or otherwise, and the final incidence angle may be compared with the acoustic impedance 34 of the target. By comparing the shape of the final incidence angle curve and the acoustic impedance curve 34 of the target, the shape's dependence upon symmetry-breaking perturbation effects may be determined 36. One or more symmetry-breaking perturbation effects may be present, including and without limitation wave mode coupling, compressional wave to shear wave coupling, phase, constructive interference, destructive interference, detector eccentricity, variations in media thickness (including and without limitation casing thickness), and dispersion. Once the shape's dependence upon symmetry breaking variables is determined 36, the perturbation effect may be calculated 38. In one or more embodiments, the perturbation effect 38 may be modeled as a transformation matrix. In one or more embodiments, perturbation effect may then be used to adjust the measured data points 40 to more accurately determine acoustic and/or ultrasonic properties of the target. Though FIG. 4 expressly discloses modeling acoustic impedance via distance, radius of curvature, and incidence angle, any method of forward inversion to calculate an acoustic property despite a perturbation effect falls within the scope of the present disclosure.

In one or more embodiments, the perturbation effect 38 may be used iteratively as showed by the dashed arrow in FIG. 1. Inversion may take place analytically or numerically including but not limited to using a nonlinear solver to evaluate one or more variables. Raytracing techniques may be forward modeled to match one or more of a property of the waveform, spectral domain, phase domain, or group delay domain. In one or more embodiments, a large library of forward modeled solutions may be generated and matched in real time rather than solved in real time. Forward-modeled solutions may be generated in real time to determine the best-fit solution for a property (for example and without limitation, acoustic impedance).

In one or more embodiments, the methods disclosed herein may be parallelized. The methods disclosed herein allow energy propagation, superposition, and analytical evaluation to be separately calculated. In one or more embodiments, the methods disclosed herein may be performed utilizing one or more graphics processing units (GPUs). GPUs are well-suited to matrix algebra and raytracing techniques. Accordingly, in certain embodiments, GPUs may be used to perform the methods disclosed herein. In one or more embodiments, the methods disclosed herein may be performed on one or more machines and in real time or otherwise. In one or more embodiments, the methods disclosed herein may be performed on a cloud computing system or a local cluster. The methods disclosed herein may be applied for inversion or applied for forward modeling; furthermore, they may be used to build a library of evaluated cases. The methods disclosed herein is most simply applied to generate a property (including and without limitation annular impedance) as a function of the signal perturbations relative to the inversion model; however, they may also be used with further setup to incorporate the inversion model and unperturbed waveform. In one or more embodiments, this unperturbed waveform may be a one-dimensional waveform to provide absolute properties. In one or more embodiments, a simplified raytracing solution may be provided in real time. In one or more embodiments, a simplified raytracing solution may be provided on a conventional CPU.

Raytracing techniques are not required to utilize the methods disclosed herein. As one example of a non-raytracing embodiment for energy propagation, energy may be represented as a thin conical shell with energy magnitude defined by a solid angle and a gaussian or dampening oscillator gaussian. Non-raytracing embodiments may make some computations more efficient than raytracing, albeit more complex in linearization. In one or more embodiments, Taylor series expansions may be used as an approximation to make such energy propagation mechanisms computationally efficient and separable for parallelization. In certain embodiments, improvements to the raytracing model can also be made by evaluating the ray angle in a Taylor Series form to overcome some limiting assumptions. In certain embodiments, other mathematical forms may be used to realize the matrix formalism computation for non-paraxial rays.

Evaluation models may calculate any number of dimensions, for example and without limitation, one dimension, two dimensions, three dimensions, or four dimensions with three spatial dimensions and one temporal dimension. The evaluation models may be empirical or heuristic. Those skilled in the art may find it useful to use one or more different types of models, including and without limitation machine learning models or symbolic regression models. Differentiation may take place analytically or numerically and may be progenerated with tables for rapid differentiation evaluation.

Figure 5:
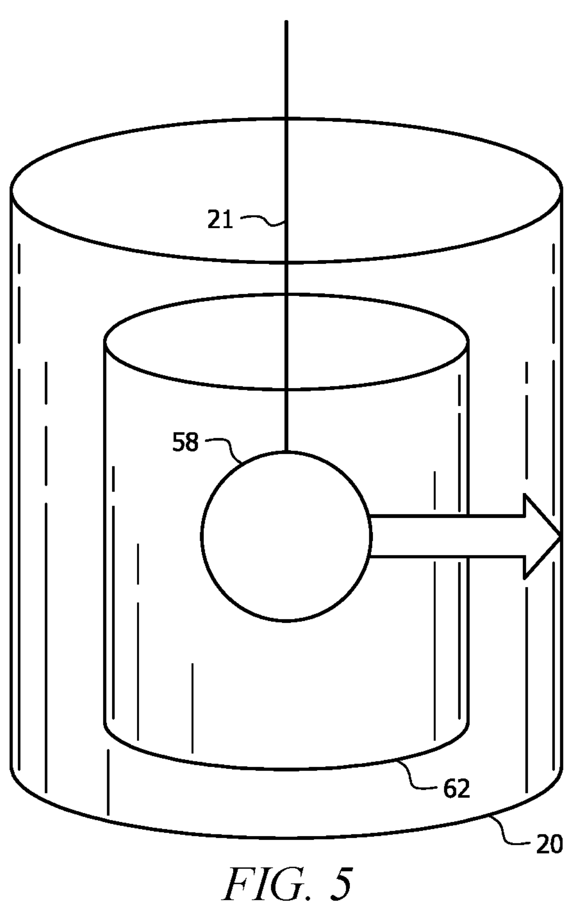
FIG. 5 depicts an exemplary diagram of a transmitter emitting a ray within a casing in a down-hole formation, according to one or more aspects of the present disclosure.

FIG. 5 depicts an exemplary diagram of a transmitter emitting a ray within a casing in a downhole formation, according to one or more aspects of the present disclosure. In one or more embodiments, the casing 62 is within the downhole formation 20. One or more transmitters (that is, energy emitters) 58 within the casing 62 is suspended via one or more wires 21. Note that in some embodiments, the one or more transmitters 58 may be located outside of the casing 62. Also note that in some embodiments, the transmitters 58 may not be suspended via a wire 20. In some embodiments, the one or more transmitters 58 may combine with one or more receivers to comprise one or more transmitter-receiver units; in some embodiments, the one or more transmitters 58 may be separate from one or more receivers. The one or more transmitters 58 may emit waves that pass through the casing 62, reach the formation 20, and reflect back to one or more receivers; alternatively, the waves may reflect back from the casing 62. These waves may be one or more of acoustic, ultrasonic, optical, x-ray, ion, or electron beam waves. Those skilled in the art will understand that this is not a comprehensive list, a wide variety of waves falls within the scope of the present disclosure. Though FIG. 5 depicts a casing in a downhole formation, note that all media fall within the scope of the present disclosure; the casing-based embodiments disclosed herein are purely exemplary and non-limiting.

Figure 6:
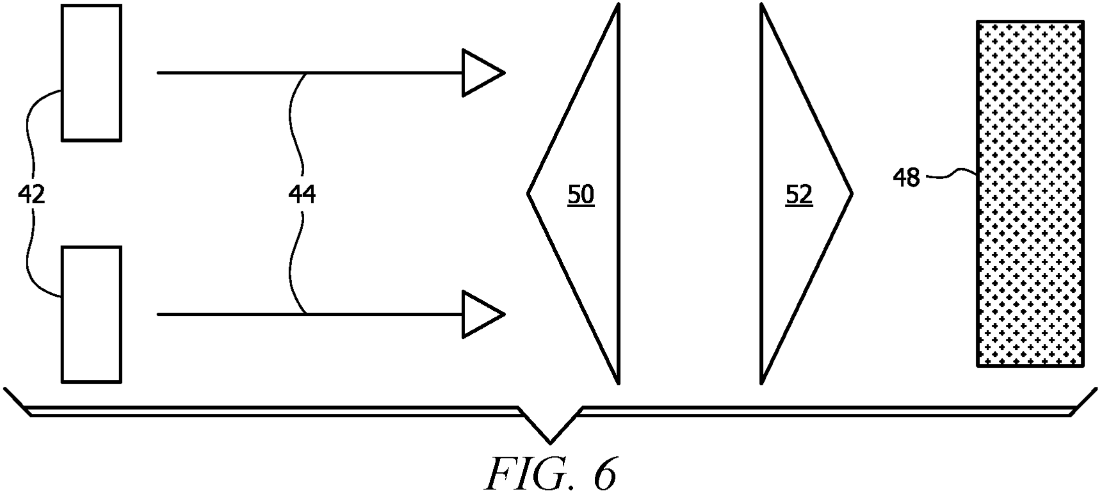
FIG. 6 depicts an exemplary diagram of acoustic energy propagating toward a casing with varying thickness, according to one or more aspects of the present disclosure.

FIG. 6 depicts an exemplary diagram of acoustic energy propagating toward a casing with varying thickness, according to one or more aspects of the present disclosure. The one or more transmitters 42 (that is, energy emitters) emit waves 44 that propagate through a medium until they impinge a first end of a casing 50. After reaching the first end of a casing 50, the waves may pass through the casing and reach the second end of a casing 52. Next, the waves may exit the casing, entering a medium. The black box 48 represents the edge of the medium. At any point during the waves' path from the transmitters to the edge of the medium 48, the waves may be reflected back toward one or more receivers. In many embodiments, the medium through which the waves propagate is the cement of a downhole formation. The first end of a casing 50 and the second end of a casing 52 are herein depicted as triangles in order to represent a casing with varying thickness. In one or more embodiments, the properties of a medium surrounding a casing with varying thickness may be measured. Though FIG. 6 depicts a graph of a ray's propagation distance plotted against various azimuthal angles for casings with various outer diameters, note that all media fall within the scope of the present disclosure; the casing-based embodiments disclosed herein are purely exemplary and non-limiting.

The equations below demonstrate one method by which shear-wave coupling of a 3-D effect may be incorporated into a one-dimensional model via raytracing in one or more embodiments of the present disclosure. In the below example, the shear wave coupling loss is calculated as a reflectivity coefficient and incorporated into an appropriate model. The appropriate model may take one of several forms, including and without limitation a one-dimensional raytracing model. The model may be used to calculate a magnitude of energy for each ray at each angle. Alternatively, the energy loss may be calculated separately for each interaction and subtracted from the final ray at the point of evaluation. The points of evaluation are transmitters 42. One example incorporating shear-wave coupling of a 3-D effect into a 1-D model via raytracing is provided below.

$$R_d = \frac{\det[a^{(1)}]}{\det[a]} \quad T_d = \frac{\det[a^{(2)}]}{\det[a]}$$

$$R_s = \frac{\det[a^{(3)}]}{\det[a]} \quad T_s = \frac{\det[a^{(4)}]}{\det[a]}$$

Where $R_d$ represents reflection of a dilatational wave, $R_s$ represents reflection of a shear wave, $T_d$ represents transmittance of a dilatational wave, $T_s$ represents transmittance of a shear wave, det is short for "determinant," a represents a matrix, and superscripts of a (for example, $a^{(1)}$) represent the corresponding column of the matrix (for example, the first column of the matrix). Further:

$$a = \begin{bmatrix} -\cos\theta\, d_1 & -\cos\theta\, d_2 & -\sin\theta\, s_1 & \sin\theta\, s_2 \\ -\sin\theta\, d_1 & \sin\theta\, d_2 & \cos\theta\, s_1 & \cos\theta\, s_2 \\ iwZd_1 \cos 2\theta\, s_1 & -iwZd_2 \cos 2\theta\, s_2 & iwZ \sin 2\theta\, s_1 & iwZs_2 \sin 2\theta\, s_2 \\ iwZs_1 \frac{Cs_1}{Cd_1} \sin 2\theta\, d_1 & iw\frac{Cs_2}{Cd_2} \sin 2\theta\, d_2 & -iw \cos 2\theta\, s_1 & iwZs_2 \cos 2\theta\, s_2 \end{bmatrix}$$

Where cos is short for cosine, sin is short for sine, θ represents the wave's incidence angle, $d_1$ represents a first speed of a dilatational wave in the medium, $d_2$ represents a second speed of a dilatational wave in the medium, $s_1$ represents a first speed of a shear wave in the medium, $s_2$ represents a second speed of a shear wave in the medium, i represents a complex number, w represents the phase of a wave, Z represents acoustic impedance, Cs represents a substitution column for the shear wave, and Cd represents a substitutional column for the dilatational wave. Further:

Compressional:

$$b = \begin{bmatrix} -\cos\theta\, d_1 \\ \sin\theta\, d_1 \\ -iwZd_1\cos 2\theta\, s_1 \\ iw\frac{Cs_1}{Cd_1}\sin 2\theta\, d_1 \end{bmatrix}$$

Shear:

$$c = \begin{bmatrix} \sin\theta\, s_1 \\ \cos\theta\, s_1 \\ iwZs_1\sin 2\theta\, s_1 \\ iwZs_1\cos 2\theta\, s_1 \end{bmatrix}$$

Where b and c are substitution columns for compressional waves and shear waves respectively that are substituted into the column of [a] based on specification of the $R_d$, $R_s$, $T_d$, and $T_s$ equations to calculate the transmission or reflection coefficient.

Figure 7:
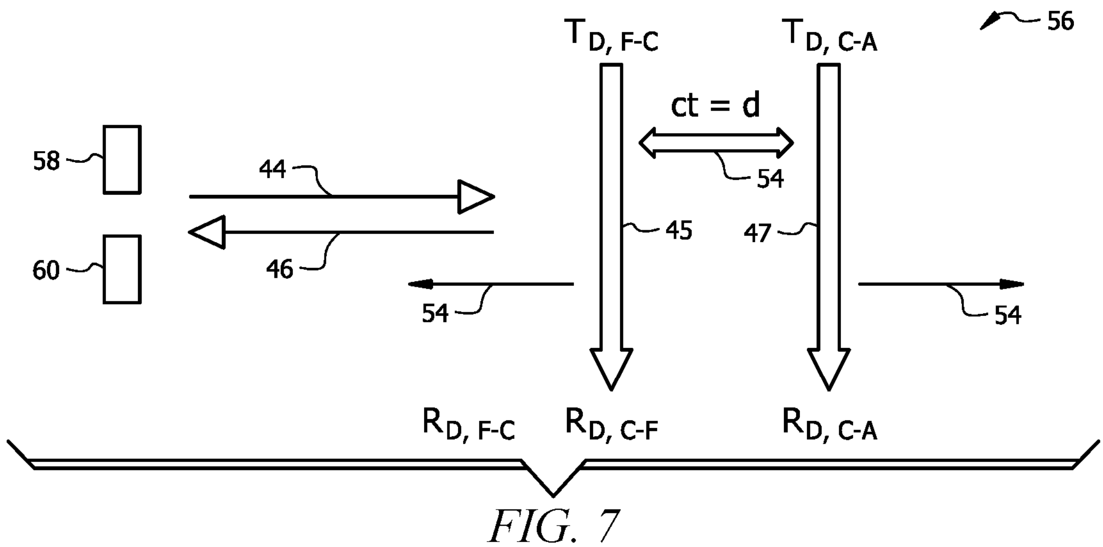
FIG. 7 depicts an exemplary diagram of acoustic energy propagating toward a casing and the resulting shear wave, according to one or more aspects of the present disclosure.

FIG. 7 depicts an exemplary diagram of acoustic energy propagating toward a casing and the resulting shear wave, according to one or more aspects of the present disclosure. In one or more embodiments, one or more transmitters 58 (that is, energy emitters) emits waves 44, 46, and 54 which may be reflected to one or more receivers 60. The one or more receivers 60 may exist in a single apparatus combined with the one or more transmitters 58; alternatively, the one or more receivers 60 may be separate from the one or more transmitters 58. Between the one or more transmitters 58 and the first end of the casing 45, waves 44 travel through the medium and impinge the front end of the casing 45. Additionally, reflected waves 46 travel away from the front end of the casing 45. Some of the energy 54 is trapped or stored, reverberating from a casing 45 and 47. The casing 45 and 47 is surrounded by the annulus 56. As the waves 44 reach the first end of the casing 45 or the second end of the casing 47, the waves 45 may propagate as sheer waves along the surface of the casing 45 and 47. Though FIG. 7 depicts a casing, note that all media fall within the scope of the present disclosure; the casing-based embodiments disclosed herein are purely exemplary and non-limiting.

Both inside and outside a medium (for example and without limitation, a casing 45 and 47), the distance a wave propagates (d) may be calculated by multiplying the speed of the wave (c) by the time in which the wave propagates (t). T represents transmittance and R represents reflection. The subscript D represents a dilatational wave, also known in the art as a compressional wave. The subscript F represents fluid. The subscript C represents the casing 45 and 47. The subscript A represents the annulus 56. Accordingly, the label $T_{D,\ F\text{-}C}$ represents the transmittance of a dilatational wave 44, 46, or 54 from the fluid to the casing 45 and 47. The label $R_{D,\ C\text{-}A}$ represents the reflection of a dilatational wave 46 from the casing 45 and 47 to the annulus 56. The $T_{D,\ C\text{-}A}$, $R_{D,\ F\text{-}C}$, and $R_{D,\ C\text{-}F}$ labels may be read in the same manner.

Assuming that shear waves are lost to the media, the following equation is true:

$$R(w) = R_1 + (1-R_1)\left[1 + \left(-R_2R_1e^{i\omega T}\right) + \left(-R_2R_1e^{i\omega T}\right)^2 + \cdots\ \right]R_2(1-R_1)e^{i\omega T}$$

Wherein $R_1+(1-R_1)$ represents the normal incidence and $[1+(-R_2R_1e^{i\omega T})+(-R_2R_1e^{i\omega T})^2+\ldots]$ represents the positive term. Further, $(-R_2R_1e^{i\omega T})$ represents the first transit, $(-R_2R_1e^{i\omega T})^2$ represents the second transit, and the nth transit is represented by $(-R_2R_1e^{i\omega T})^n$. Assuming the incident wave is at normal incidence upon interface 1 (front of casing) and interface 2 (back of casing), the following equations are true for a given interface:

$R+T=1$ and $R_{inner}=R_{outer}$.

Figure 8:
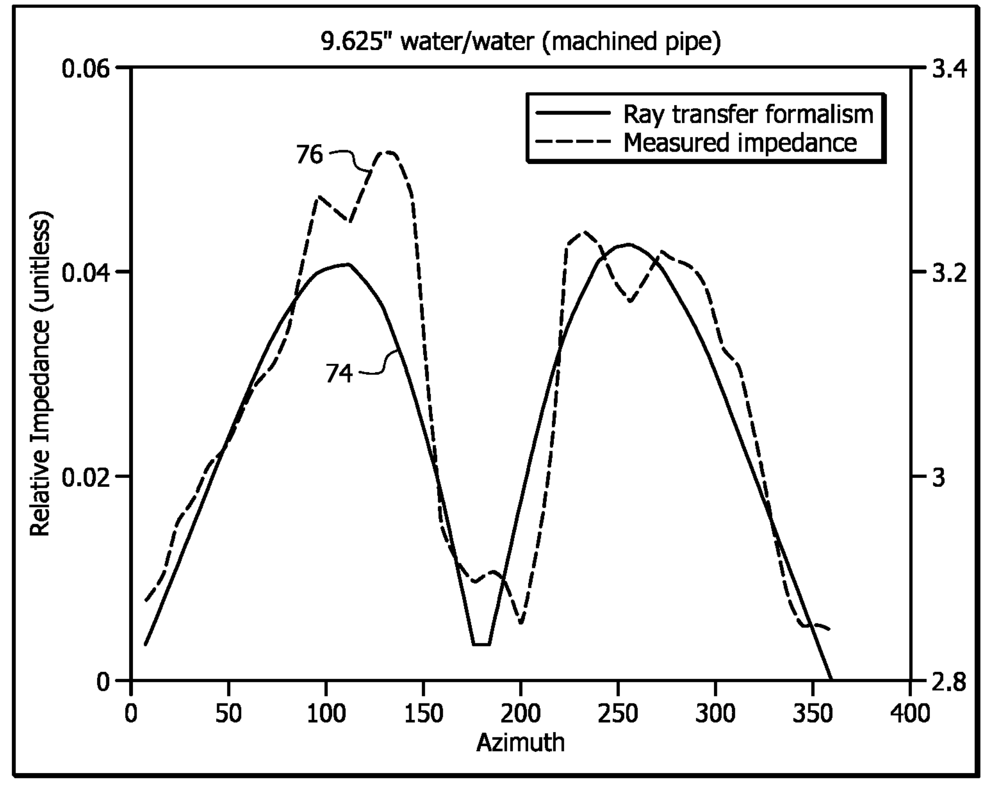
FIG. 8 depicts an exemplary graph of a paraxial ray's relationships between final incidence angles and impedance after five reverberations within a 9.625-inch outer diameter, water-filled casing surrounded by water, according to one or more aspects of the present disclosure.
Figure 9:
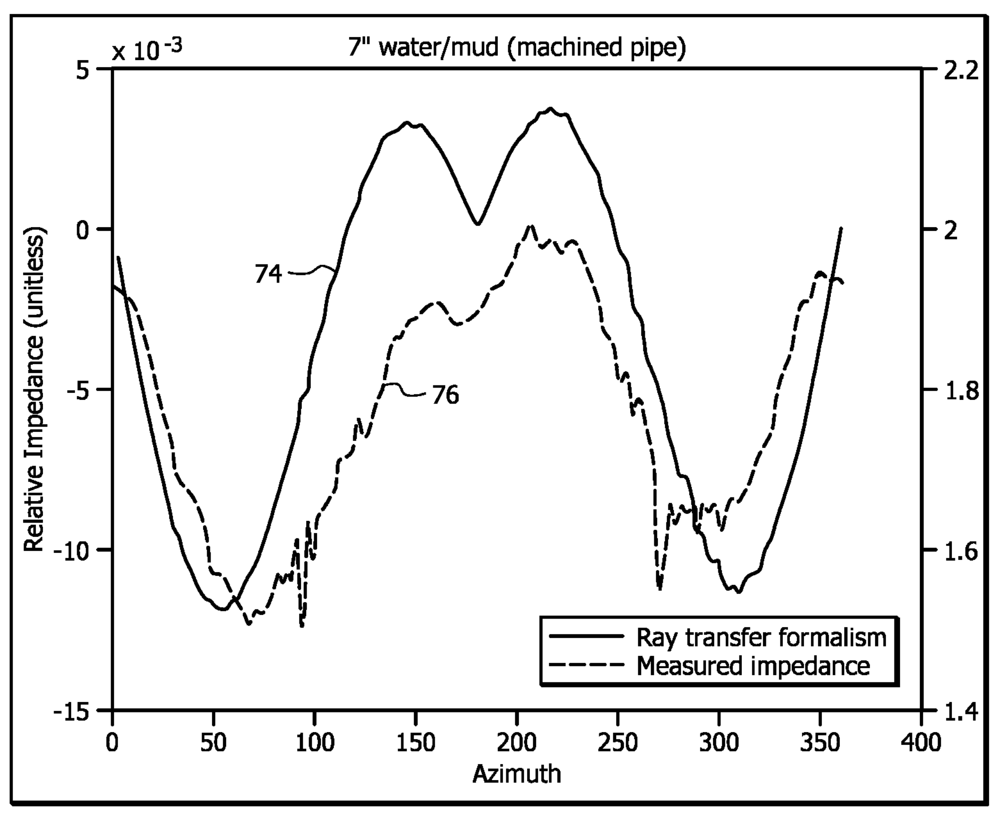
FIG. 9 depicts an exemplary graph of a paraxial ray's relationships between final incidence angles and impedance after five reverberations within a 7-inch outer diameter, water-filled casing surrounded by mud, according to one or more aspects of the present disclosure.

FIG. 8 depicts an exemplary graph of a paraxial ray's relationships between final incidence angles and impedance after five reverberations within a 9.625-inch outer diameter, water-filled casing surrounded by water, according to one or more aspects of the present disclosure. FIGS. 8 and 9 were produced via experimental data. In the FIG. 8 experiment, a 9.625-inch outer diameter machined pipe had water both inside and outside the casing. In FIGS. 8 and 9, ray transfer formalism results were recorded in real time and compared to the actual acoustic impedance of a formation. The solid line 74 represents the ray transfer formalism's estimate of acoustic impedance. The dashed line 76 represents the measured impedance. The results showed that the measured impedance depended on the outer diameter of the casing for eccentric conditions, as observed in FIGS. 8 and 9. Accordingly, FIGS. 8 and 9 show that one or more embodiments of the present disclosure may predict the shape of the measured impedance and determine the functional dependance of the shape to symmetry-breaking perturbation effects, for example and without limitation, detector eccentricity, radius of curvature, and variation in the thickness of one or more media. Though FIG. 8 depicts a graph relating to a water-filled casing, note that all media fall within the scope of the present disclosure; the casing-based embodiments disclosed herein are purely exemplary and non-limiting.

In one or more embodiments, it may be necessary to ensure three conditions are met before using an energy propagation model for which the propagation is separable from the wave property calculation. First, a mechanism to trace the path of the energy should be present. Second, the wave properties should be encoded for an ultimate superposition wave property calculation. Third, the calculation of the superposition of wave properties should be possible in order to recombine the wave effect. In one or more embodiments, the derivative of the energy propagation model may be used with respect to wave properties and their interaction with multidimensional effects, for example and without limitation, two-dimensional (2-D), 3-D, or four-dimensional (4-D) effects (that is, three spatial dimensions and one temporal dimension). Such a derivative may be an analytical derivative, a numerical derivative, or an empirical derivative. The model may be a physics-based model or an empirical model, for example and without limitation, a machine learning model. An appropriate model such that the calculation may be performed within whatever timeframe is required by the relevant application may be chosen. Because the model is applied separately from the energy propagation and superposition calculation of wave effects, the model used need not be a full model such as a full 3-D model but need only be differentiable with respect to a dimension of the effect. For example, if the model contains variations in the thickness of one or more media (for example and without limitation, casing thickness), the model may be differentiated with respect to the variation of the one or more media and then interpreted by a 3-D effect. Similarly, if the model is differentiable for the effect of the property with respect to phase, then the model may be interpreted with respect to the 3-D effects of phase. In one or more embodiments, the model may further be treated as a partial derivative for which the effects are separable. In one or more embodiments, a 1-D model relating the annular material of a material's impedance to a wave form may be differentiated with respect to, for example, the material's thickness, wherein a variation (for example, a 3-D variation) is the derivative in material thickness. To demonstrate one or more embodiments of the present disclosure, two derivations are provided in the equations below for a differentiable solution with respect to material thickness (in this non-limiting example, casing thickness) and with respect to reflectivity. The variables are as follows:

| Label | Meaning | Label | Meaning |
|---|---|---|---|
| R | Reflectance as derived from the 1-D plane wave model | i | Complex variable |
| $R_x$ | Reflectance generally | $C_t$ | Casing thickness |
| $R_a$ | Annular reflectance | Φ | Phase angle |
| $R_m$ | Mud reflectance | $V_s$ | Steel sound velocity |
| R' | Change in reflectance with respect to casing thickness | w | Angular frequency |
| $Z_m$ | Mud impedance | $Z_a$ | Annular impedance |
| $Z_s$ | Steel impedance | | |

$$R = \frac{Z_m - Z_s}{Z_m + Z_s} + \frac{\frac{4Z_mZ_s}{(Z_m+Z_s)^2} * \frac{Z_s - Z_a}{Z_s + Z_a}}{1 - \frac{Z_s - Z_m}{Z_m + Z_s} * \frac{Z_s - Z_a}{Z_s + Z_a} e^{-i2w\frac{C_Z}{V_s}}} * e^{-i2w\frac{C_Z}{V_s}}$$

$$\text{let } R_m = \frac{Z_m - Z_s}{Z_m + Z_s},\ R_a = \frac{Z_a - Z_s}{Z_a + Z_s},\ R_x = \frac{4Z_mZ_s}{(Z_m+Z_s)^2},\ \phi = \frac{2w}{V_s}$$

$$\boxed{\Rightarrow R = R_m - \frac{R_xR_a}{e^{i\phi C_t} - R_mR_a}}$$

$$\Rightarrow R = R_m + \frac{R_x(-R_a)e^{-i\phi C_t}}{1 - (-R_m)(-R_a)e^{-i\phi C_t}}$$

$$\Rightarrow R = R_m - \frac{R_xR_ae^{-i\phi C_t}}{1 - R_mR_ae^{-i\phi C_t}}$$

$$\Rightarrow \frac{\partial R}{\partial C_t} = \frac{R_xR_a\phi e^{i\phi C_t}}{\left(e^{i\phi C_t} - R_mR_a\right)^2} = \frac{(R_m - R)\phi}{e^{i\phi C_t} - R_mR_a} e^{i\phi C_t}$$

1) R from one-dimensional model:

$$R = R_m - \frac{R_xR_a}{e^{i\phi C_t} - R_mR_a}, \text{ where:}$$

$$R_m = \frac{Z_m - Z_s}{Z_m + Z_s},\ R_a = \frac{Z_m - Z_s}{Z_m + Z_s},\ R_x = \frac{4Z_mZ_s}{(Z_m+Z_s)^2},\ \phi = \frac{2iw}{V_s}$$

2) Invert R for $R_a$:

$$R_a = \frac{e^{\phi C_t}(R_m + R)}{R_m(R_m - R) + R_x}$$

3) Invert $R_a$ for $Z_a$:

$$Z_a = Z_s\frac{1 + R_a}{1 - R_a} = Z_s\left\{\frac{\left(R_m + e^{\phi C_t}\right)(R_m - R) + R_x}{\left(R_m - e^{\phi C_t}\right)(R_m - R) + R_x}\right\}$$

4) Propagation of error:

$$\Delta Z_a = \frac{\partial Z_a}{\partial C_t}\Delta C_t$$

$$\Delta Z_a = \frac{\Delta C_t}{\left(R_m - e^{\phi C_t}\right)(R_m - R) + R_x} \left[Z_s\left(e^{\phi C_t}(R_m\phi - R\phi - R') - R_mR'\right) + Z_a\left(e^{\phi C_t}(R_m\phi - R\phi - R') + R_mR'\right)\right]$$

$$\frac{\Delta Z_a}{Z_a} = \Delta C_t\left[\left[e^{\phi C_t}(R_m\phi - R\phi - R') - R_mR'\right] + \frac{e^{\phi C_t}(R_m\phi - R\phi - R') + R_mR'}{\left(R_m - e^{\phi C_t}\right)(R_m - R) + R_x}\right],$$

$$\text{where } R' = \frac{(R_m - R)\phi e^{i\phi C_t}}{e^{i\phi C_t} - R_mR_a}$$

$$R_a = \frac{\partial Z_a}{\partial R}\Delta R, \text{ where } Z_a = Z_s\left\{\frac{\left(R_m + e^{\phi C_t}\right)(R_m - R) + R_x}{\left(R_m - e^{\phi C_t}\right)(R_m - R) + R_x}\right\}$$

$$\Rightarrow \frac{\partial Z_a}{\partial R} = Z_s\frac{1}{\left(R_m - e^{\phi C_t}\right)(R_m - R) + R_x}\frac{\partial\left(\left(R_m + e^{\phi C_t}\right)(R_m - R) + R_x\right)}{\partial R} + Z_s * \left(\left(R_m + e^{\phi C_t}\right)(R_m - R) + R_x\right)\partial\left(\left(R_m - e^{\phi C_t}\right)(R_m - R) + R_x\right)$$

$$\Rightarrow \frac{\partial Z_a}{\partial R} = Z_s\left[\frac{-1}{\left(R_m - e^{\phi C_t}\right)(R_m - R) + R_x}\left(R_m + e^{\phi C_t}\right) + \frac{\left(R_m + e^{\phi C_t}\right)(R_m - R) + R_x}{\left(R_m - e^{\phi C_t}\right)(R_m - R) + R_x}\left(R_m - e^{\phi C_t}\right)\right]$$

$$\Rightarrow \frac{\partial Z_a}{\partial R} = \frac{Z_a}{\left(R_m + e^{\phi C_t}\right)(R_m - R) + R_x} \left[\frac{\left(R_m - e^{\phi C_t}\right) * \left(\left(R_m + e^{\phi C_t}\right)(R_m - R) + R_x\right)}{\left(\left(R_m - e^{\phi C_t}\right)(R_m - R) + R_x\right.} - \left(R_m + e^{\phi C_t}\right)\right]$$

$$\Rightarrow \frac{\partial Z_a}{\partial R} = \frac{Z_a * 2e^{\phi C_t}}{\left(R_m + e^{\phi C_t}\right)(R_m - R) + R_x}\left[\frac{R_m(R_m - R) - R_m^2 + RR_m - R_x}{\left(R_m - e^{\phi C_t}\right)(R_m - R) + R_x}\right]$$

$$\Rightarrow \frac{\partial Z_a}{\partial R} = \frac{\partial Z_ae^{\phi C_t}}{\left(R_m + e^{\phi C_t}\right)(R_m - R) + R_x}\left[\frac{-R_x}{\left(R_m - e^{\phi C_t}\right)(R_m - R) + R_x}\right]$$

Because the model is interpreted via a signal, the perturbation on the signal by a multidimensional effect must be calculated. Such a perturbation calculation on the signal requires an energy propagation model; in the domain of acoustic and ultrasonic waves, the perturbation calculation on the signal also requires wave effects. In one or more embodiments, raytracing techniques may be used to calculate energy propagation. In one or more embodiments, raytracing techniques may be used. Raytracing techniques may be accomplished via matrix algebra. Furthermore, raytracing techniques' effects are not burdensome to render if the matrices' form may be derived, approximated, or estimated. For example and without limitation, in one or more embodiments, free space propagation of the signal covering the distance (d) from the transducer to an inner casing wall may be modeled with the following 2×2 matrix:

$$\begin{vmatrix} 1 & d \\ 0 & 1 \end{vmatrix}$$

In one or more embodiments, the above matrix may also model free space propagation of the signal covering the distance (d) from the inner dimension of the wall to the outer dimension of the wall. In one or more embodiments, the radius of curvature (R) and incidence angle (θ) of a reflection from a material (such as a casing) may be modelled with the following 2×2 matrix:

$$\begin{vmatrix} 1 & 0 \\ \frac{-2}{R} & 1 \end{vmatrix}$$

These matrices, along with other refraction, reflection, translation, and shear transformation matrices, may be combined in the order consistent with the propagation direction to establish an overall effective 2×2 transformation matrix. In one or more embodiments, this effective 2×2 transformation matrix may then be used to model the evolution of an initial paraxial ray, its final displacement, and its angle according to the following formula:

$$\begin{pmatrix} x_f \\ \theta_f \end{pmatrix} = \begin{vmatrix} A & B \\ C & D \end{vmatrix} \begin{pmatrix} x_i \\ \theta_i \end{pmatrix}$$

In the above equation, the 2×2 ABCD matrix is the effective transformation matrix of whichever experimental configuration is modelled; it includes all propagation, refraction, and reflection matrix contributions. The A term is attributed to spatial magnification. The A term is mathematically equivalent to the derivation of $X_f$ with respect to $X_i$. The D term is attributed to Angular magnification. The D term is mathematically equivalent to the derivative of $\theta_f$ with respect to $\theta_{in}$.

In this manner, in one or more embodiments, the 'reverberation window' effect of a ray may be modeled, normalized to the first echo, as the effective transformation matrix series of (1) propagation, (2) reflection from the concave casing, (3) backward propagation, and (4) reflection from the convex casing. In one or more embodiments, a formation evaluation tool such as The Circumferential Acoustic Scanning Tool-Extended-Range Total ("CAST-XRT") may be used to determine the thickness of one or more media (Ct) (for example and without limitation, casing thickness), angle of incidence ($\theta_{in}$), and radius of curvature equal to the radius of the one or more media. Subsequently, a ray's final angle with respect to the optical axis after five reverberations may be calculated. In one or more embodiments, this calculation may be normalized to the first echo such that refraction effects cancel out.

FIG. 9 depicts an exemplary graph of a paraxial ray's relationships between final incidence angles and impedance after five reverberations within a 7-inch outer diameter, water-filled casing surrounded by mud, according to one or more aspects of the present disclosure. FIGS. 8 and 9 were produced via experimental data. In the FIG. 9 experiment, a 7-inch outer diameter machined pipe had water inside the casing and mud outside the casing. In FIGS. 8 and 9, ray transfer formalism results were recorded in real time and compared to the actual acoustic impedance of a formation. The solid line 74 represents the ray transfer formalism's estimate of acoustic impedance. Impedance may be measured using any impedance-measuring tool known in the art (for example and without limitation, CAST-XRT) using any suitable known algorithm (for example and without limitation, the conventional frequency domain algorithm). The results showed that the measured impedance depended on the outer diameter of the casing for eccentric conditions, as observed in FIGS. 8 and 9. Accordingly, FIGS. 8 and 9 show that one or more embodiments may predict the shape of the measured impedance and determine the functional dependance of the shape to symmetry-breaking perturbation effects, for example and without limitation, detector eccentricity, radius of curvature, and the variation in thickness of one or more media. Though FIG. 9 depicts a graph relating to a water-filled casing, note that all media fall within the scope of the present disclosure; the casing-based embodiments disclosed herein are purely exemplary and non-limiting.

FIGS. 8 and 9 serve as proofs of concept. FIG. 9 is similar to FIG. 8 insofar as FIG. 9 is an example of the raytracing model's ability to predict shape dependence upon symmetry-breaking perturbation effects. FIG. 9 differs from FIG. 8 because the relevant symmetry-breaking perturbation effects-detector eccentricity and radius of curvature-produced an "M" shape in FIG. 9 as opposed to the "W" shape in FIG. 8.

In one or more embodiments, a shear coupling matrix effect may be derived in matrix form and be included as an effect. The shear coupling matrix effect may impact one or more of the energy propagation (for example and without one limitation, one or more of reflection, transmission, and refraction) and any imbedded wave property within the ray (for example and without limitation, one or more of phase, magnitude, and dispersion). Each matrix element may represent the properties of one or more of the medium, ray, and wave. By this mechanism, different rays may have different magnitudes of properties (for example, energy) and different directions.

In one or more embodiments, a series of waves may be used to represent a beam profile. Rays may be sampled by in one or more ways, for example and without limitation: (1) Monte Carlo methods, (2) experimental design methods with strategically positioned rays designed to effectively represent a composite beam, (3) analytical methods of positioning rays for a given set of environmental properties (for example and without limitation, one or more of material properties, logging fluid properties, material geometry, and variations in the thickness of one or more media), (4) as a single average or composite, (5) as a fixed grid, and (6) as a function of a gradient. In one or more embodiments, the solution may be analyzed for sufficiency such that the density or gradient of the spacing may be adjusted to provide the desired resolution for a case. In certain embodiments, Baylean prior knowledge from within the well or exterior to the well may be used to determine the best sampling setup and the best sampling method.

As the energy propagation is calculated, any imbedded wave property may be tracked. For example, phase changes upon reflection. Phase may also be distorted via smearing, dispersion, or another method within a medium or from a surface condition. In one or more embodiments, perturbations may be implemented as a function of the path. For example, two adjacent rays with differing path distances through different media will contain both the phase distortion of the path and a phase shift as a function of the path. Such a phase shift may be calculated as a superposition at the point of evaluation. In one or more embodiments, the point of evaluation may be a transducer.

In one or more embodiments, a superposition may apply a combination of the wave properties for each ray with magnitude being at least one property (that is, at least the combination of the magnitudes of the rays). The superposition may be calculated within any combination of one or more mediums. In one or more embodiments, the superposition may be applied more than once within a medium. In certain embodiments, multiple superposition calculations may be applied. For example and without limitation, multiple superposition calculations may be applied when a medium is very long. The superposition calculation allows ray properties to be influenced by neighboring ray properties. Distant rays may be influenced with lesser secondary effects according to various embodiments, for example and without limitation, an inverse square ratio principle or other analytical form. Intermittent superposition calculations allow evolved rays to be evaluated at the point of signal evaluation; for example, at a transducer. The superposition calculation may take place in one or more ways, for example and without limitation, via an average or an analytical form. An average may be a weighted average, geometric average, crossover effect, or other form of average. An analytical form may be empirical-based, physics-based, diffusion-based, or another analytical form.

In one or more embodiments, a transducer response function (for example, a flat function, a gaussian tension function, or another type of function) may be applied to combine the wave properties of the rays striking the transducer simultaneously or within a response time element. The signal perturbations may be calculated in one or more embodiments as a perturbation on the measured property.

As a practical example, in one or more embodiments, a transducer may emit a signal which reaches a non-uniform casing at an angle of incidence and offset from the casing. The non-uniform casing may be varying at the front face or back face for both an undulation in offset and casing thickness. Geometric abnormalities like the undulation in offset and casing thickness may be measured both azimuthally and along the axial direction of the casing for a 3-D evaluation or description of the casing. Changes in the position of the transducer and undulations in the casing affect the energy propagation and wave properties of the waves. The above example discusses a casing, but any one or more media fall within the scope of the present disclosure. One or more of constructive interference and destructive interference may occur over different positions of the transducer receiver. Energy may miss the transducer relative to the first echo of a pulse echo ultrasonic cement evaluation. One or more methods described herein may track the perturbation of the signal at the transducer head and evaluate the effect of those signal perturbations on an interpretation model. In some embodiments, a perturbation-tracking and interpretation model may consider the partial derivative of the signal perturbation as separable with respect to a wave property like annular impedance. In one or more embodiments, the perturbated property may then be used to adjust the measured property by that model. The adjustment may be applied via a transfer function to properties derived by other models, wherein the transfer function may be an offset, gain, linear function, or nonlinear function.

Figure 10:
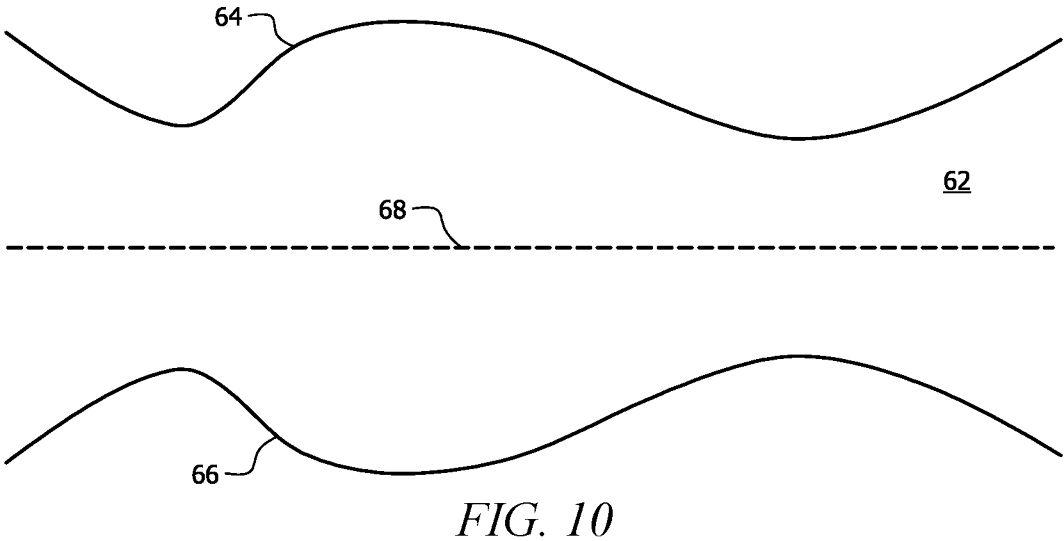
FIG. 10 depicts an exemplary diagram of a symmetrical casing used in an assumption made in one or more aspects of the present disclosure.

FIG. 10 depicts an exemplary diagram of a symmetrical casing used in an assumption made in one or more aspects of the present disclosure. In one or more embodiments, the model's computational burden may be lessened by one or more simplifying assumptions. In one or more embodiments, the change in thickness of one or more media (for example and without limitation, casing thickness) may be assumed to be symmetrical as shown in FIG. 10. In this simplifying assumption, the casing 62 or other media may vary in thickness throughout the one or more media. Nevertheless, in one or more embodiments, the one or more media may be assumed to be symmetrical; for example and without limitation, the first edge of the casing 64 and the second edge of the casing 68 may be assumed to be equidistant from the center of the casing 68. The simplifying assumptions of FIGS. 10 and 11A-B do not hold for a non-normal angle of incidence, $$R(w) = R_1 + (1+R_1)\left[1 + \left(-R_2R_1e^{i\omega T}\right) + \left(-R_2R_1e^{i\omega T}\right)^2 + \dots\ \right]R_2(1-R_1)e^{i\omega T}$$

Where:

$R_1$=first reflection, $R_2$=second reflection,

R(w)=the plane wave 1-D solution for frequency dependent reflectivity, i=complex variable, w=angular frequency, T=Time, $(-R_2R_1e^{i\omega T})$=first reverberation, $(-R_2R_1e^{i\omega T})^2$=second reverberation, and $(1-R_1)$=transmitted energy.

For $$T = \frac{d}{CD_c},$$

the above equation goes to:

$$R(w) = Rd_{F-C} + Td_{F-C}\left[1 + \sum_{1}^{n}\left(-Rd_{C-F} * Rd_{C-F}e^{i\omega T}\right)^n\right] * Rd_{C-A}Td_{C-F}e^{i\omega T}$$

Where:

d=casing thickness, and $Cd_c$=speed in the casing.

For each reverberation cycle, "n", where $d_{F-C}$ is a compressional wave transition from the fluid to the casing, $d_{C-F}$ is a compressional wave transition from the casing to the fluid, and $d_{C-A}$ is a compressional wave transition from the casing to the annulus. The following simplifying assumptions may be made, where:

$\theta_{C1}$=Angle of incidence with respect to the front face of the casing $\theta_{C2}$=Angle of incidence with respect to the back face of the casing In one or more embodiments, the change in thickness of one or more media may be assumed to be symmetrical, as depicted in FIG. 10. This may be represented mathematically as $\theta_{C1}=-\theta_{C2}$. Alternatively, in one or more embodiments a highly smoothed and measured front-face offset may be used to calculate $\theta_{C1}$. The measured front-face offset used to calculate $\theta_{C1}$ may then be assigned to the back face of the casing to calculate $\theta_{C2}$. Though FIG. 10 depicts a casing, note that all media fall within the scope of the present disclosure; the casing-based embodiments disclosed herein are purely exemplary and non-limiting.

Figure 11A:
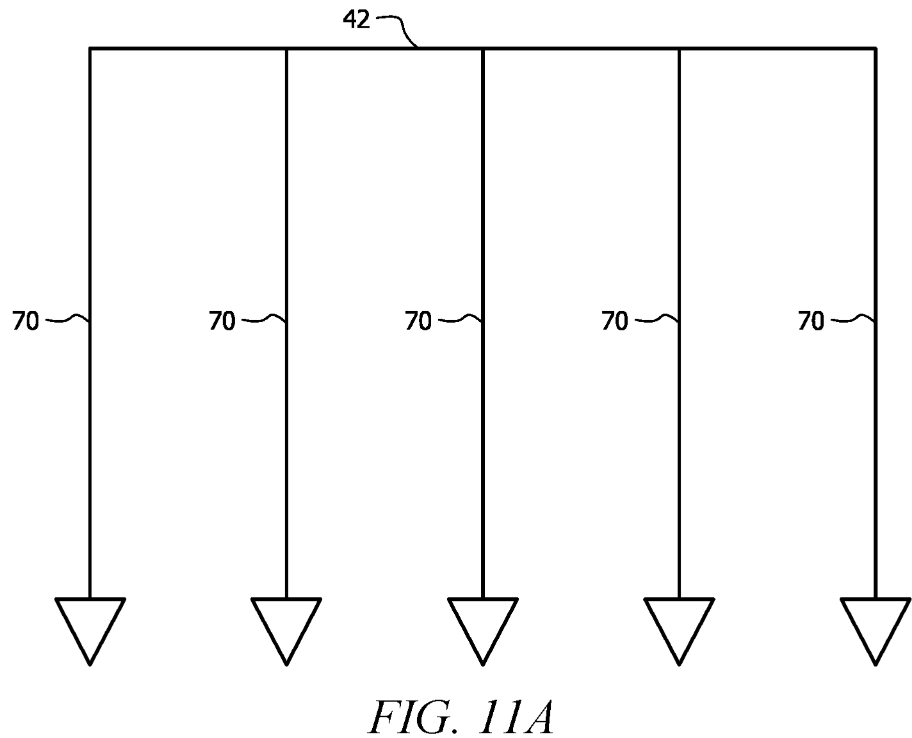
FIG. 11A depicts an exemplary diagram of a beam profile with parallel waves used in an assumption made in one or more aspects of the present disclosure.

FIG. 11A depicts an exemplary diagram of a beam profile with parallel waves used in an assumption made in one or more aspects of the present disclosure. In one or more embodiments, the model's computational burden may be lessened by one or more simplifying assumptions. In one or more embodiments, the beam waves 70 may be assumed to travel from the transducer 42 in parallel as depicted in FIG. 11A.

Figure 11B:
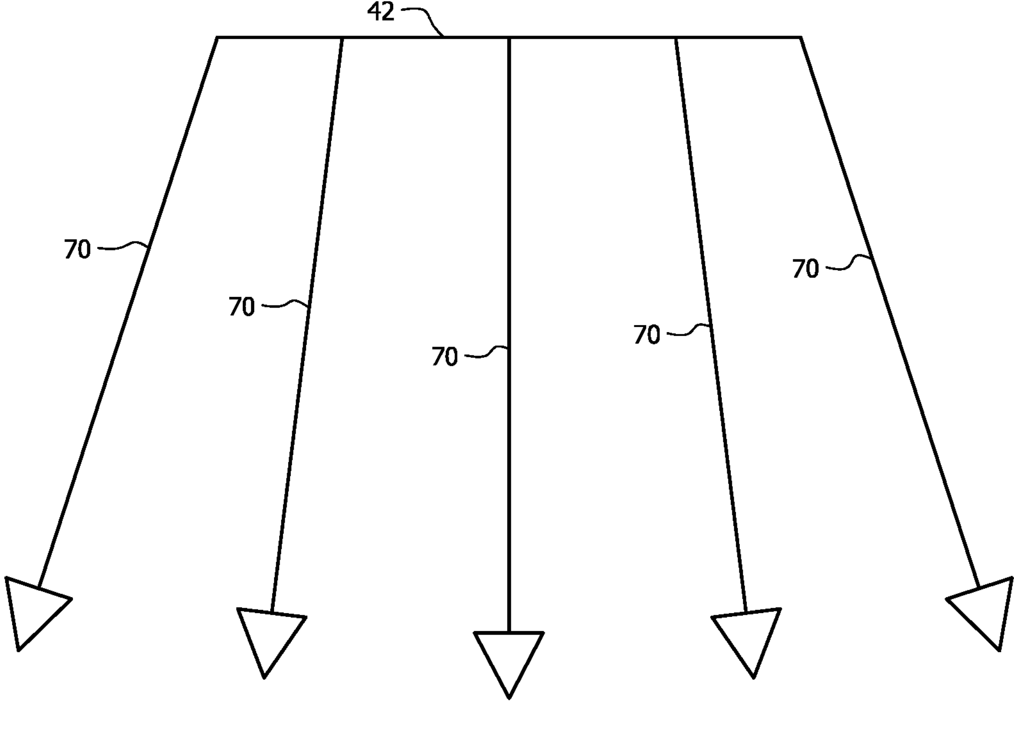
FIG. 11B depicts an exemplary diagram of a beam profile with non-parallel waves used in one or more aspects of the present disclosure.

FIG. 11B depicts an exemplary diagram of a beam profile with non-parallel waves used in one or more aspects of the present disclosure. In one or more embodiments, the parallel beam wave assumption of FIG. 11A may be rejected in favor of a model in which beam waves 70 travel from the transducer 42 in a non-parallel manner. In one or more embodiments, an integral or sample summation may be used to achieve a non-parallel beam wave model.

For each reverberation, the incident angles may be kept track of via Snell's Law. In one or more embodiments, the incident angles may be labeled as follows:

$\theta^o_{R_{F-C}}$ = First reflection back to one or more media (for example, a casing)

$\theta^o_{T_{F-C}}$ = First transmission angle $\theta^n_{R_{C-A}}$ = Reflection angle on the $n^{th}$ reverberation on the back of the one or more media $\theta^n_{R_{C-F}}$ = Reflection angle of the $n^{th}$ reverberation on the front of the one or more media $\theta^o_{T_{C-F}}$ = Transmission of the $n^{th}$ reverberation from the interface of one or more media For each reverberation, the first transmission angle $$(\theta^n_{T_{C-F}})$$

may be calculated from the compiled effects of the previous reverberations. In one or more embodiments, a geometric effect of beam spot with the transducer may be calculated or ignored. In one or more embodiments, it may be assumed that shear wave coupling is lost to the media. In one or more embodiments, a more complex model may be used to account for shear wave coupling.

In certain embodiments, it may be assumed that homogenous media have shear-wave-to-compressional-wave relationships. In certain embodiments, it may be necessary (1) to find the shear-wave-to-compressional-wave relationship through a model or through measurement, (2) to use a constant, or (3) to fit the data (for example and without limitation, by linear regression). In certain embodiments, an analytical form may be used to find the shear-wave-to-compressional-wave relationship. In certain embodiments, a functional form may be used to find the shear-wave-to-compressional-wave relationship. In embodiments using a functional form, the functional form may be solved for unknown parameters through a nonlinear solver.

Figure 12:
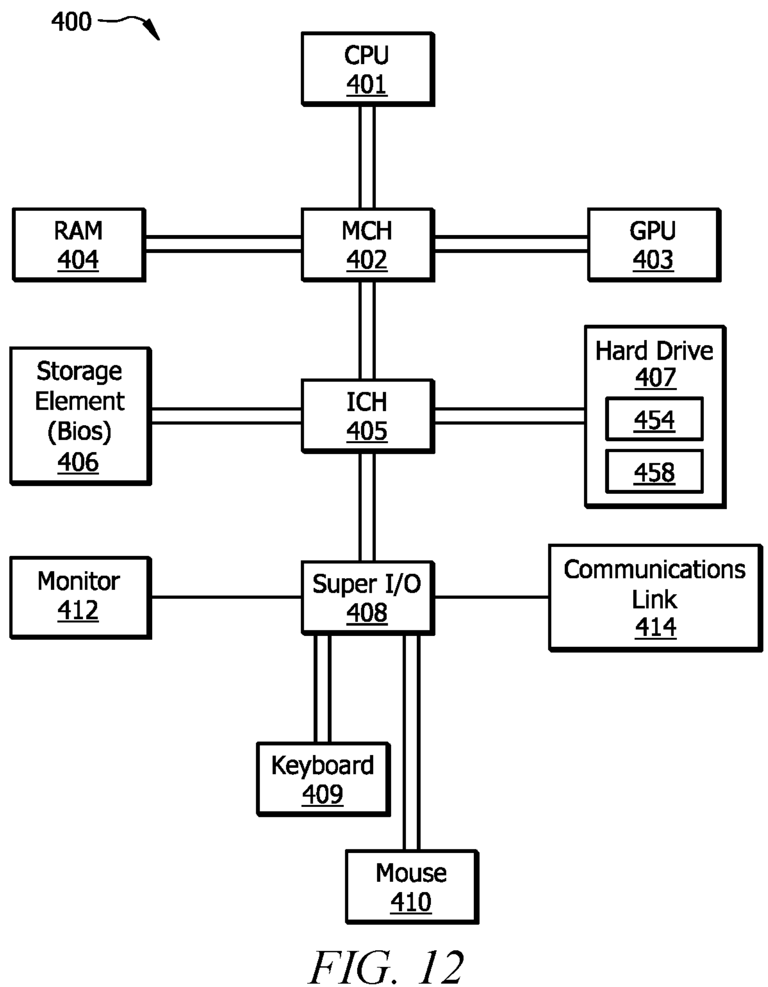
FIG. 12 depicts a schematic diagram of an information handling system, according to one or more aspects of the present disclosure.

FIG. 12 depicts a schematic diagram of an information handling system, according to one or more aspects of the present disclosure. A processor or central processing unit (CPU) 401 of the information handling system 400 is communicatively coupled to a memory controller hub (MCH) or north bridge 402. The processor 401 may include, for example, a microprocessor, microcontroller, digital signal processor (DSP), application specific integrated circuit (ASIC), or any other digital or analog circuitry configured to interpret and/or execute program instructions and/or process data. Processor 401 may be configured to interpret and/or execute program instructions or other data retrieved and stored in any memory such as hard drive 407. Program instructions or other data may constitute portions of a software or application, for example, application 458 or data 454, for carrying out one or more methods described herein. Memory may include read-only memory (ROM), random access memory (RAM), solid state memory, or disk-based memory. Each memory module may include any system, device, or apparatus configured to retain program instructions and/or data for a period of time (for example, non-transitory computer-readable media). For example, instructions from a software program or application 458 or data 454 may be retrieved and stored in memory for execution or use by processor 401. In one or more embodiments, the memory or the hard drive 407 may include or comprise one or more non-transitory executable instructions that, when executed by the processor 401, cause the processor 401 to perform or initiate one or more operations or steps. The information handling system 400 may be preprogrammed or it may be programmed (and reprogrammed) by loading a program from another source (for example, from a CD-ROM, from another computer device through a data network, or in another manner).

The data 454 may include treatment data, geological data, fracture data, microseismic data, mud candidate data, borehole imager measured data, inversion-estimated imaging properties, or any other appropriate data. The one or more applications 458 may include one or more machine learning models, applications for one or more of down-sampling measured data, calculating misfits or to minimize cost functions, to perform petrochemical inversions, to solve for formation permittivity, to align measured data based on depth, azimuth, resolution, or any other measurement, extrapolating permittivity, scaling coefficients to match borehole imager measurements with dielectric tool measurements, calculate dispersion curves of permittivity, calibrating coefficients, or any other appropriate applications. In one or more embodiments, a memory of a computing device may include additional or different data, application, models, or other information. In one or more embodiments, the data 454 may include geometric data. For example, the geometric data may include one or more of transducer eccentricity, thickness variation, or other geometric abnormalities. The geometric data may include one or more treatment parameters that have been optimized or selected based on numerical simulations of fracture propagation. In one or more embodiments, the data 454 may include one or more signals received by one or more receivers 60 of FIG. 7.

The one or more applications 458 may comprise one or more software programs or applications, one or more scripts, one or more functions, one or more executables, or one or more other modules that are interpreted or executed by the processor 401. For example, the one or more applications 458 may include a fracture design module, a reservoir simulation tool, a hydraulic fracture simulation model, or any other appropriate function block. The one or more applications 458 may include machine-readable instructions for performing one or more of the operations related to any one or more embodiments of the present disclosure. The one or more applications 458 may include machine-readable instructions for generating a user interface or a plot. For example, the one or more applications 458 may include one or more of fracture geometry (for example, length, width, spacing, orientation, etc.), pressure plot, and hydrocarbon production performance. The one or more applications 458 may obtain input data, such as treatment data, geological data, fracture data, measurement data, or other types of input data, from the memory 403, from another local source, or from one or more remote sources (for example, via the one or more communication links 414). The one or more applications 458 may generate output data and store the output data in the memory 403, hard drive 407, in another local medium, or in one or more remote devices (for example, by sending the output data via the communication link 414).

Modifications, additions, or omissions may be made to FIG. 12 without departing from the scope of the present disclosure. For example, FIG. 12 shows a particular configuration of components of information handling system 400. However, any suitable configurations of components may be used. For example, components of information handling system 400 may be implemented either as physical or logical components. Furthermore, in some embodiments, functionality associated with components of information handling system 400 may be implemented in special purpose circuits or components. In other embodiments, functionality associated with components of information handling system 400 may be implemented in configurable general-purpose circuit or components. For example, components of information handling system 400 may be implemented by configured computer program instructions.

Memory controller hub 402 may include a memory controller for directing information to or from various system memory components within the information handling system 400, such as memory, storage element 406, and hard drive 407. The memory controller hub 402 may be coupled to memory 403 and a graphics processing unit (GPU) 404. Memory controller hub 402 may also be coupled to an I/O controller hub (ICH) or south bridge 405. I/O controller hub 405 is coupled to storage elements of the information handling system 400, including a storage element 406, which may comprise a flash ROM that includes a basic input/output system (BIOS) of the computer system. I/O controller hub 405 is also coupled to the hard drive 407 of the information handling system 400. I/O controller hub 405 may also be coupled to an I/O chip or interface, for example, a Super I/O chip 408, which is itself coupled to several of the I/O ports of the computer system, including a keyboard 409, a mouse 410, a monitor 412 and one or more communications link 414. Any one or more input/output devices receive and transmit data in analog or digital form over one or more communication links 414 such as a serial link, a wireless link (for example, infrared, radio frequency, or others), a parallel link, or another type of link. The one or more communication links 414 may comprise any type of communication channel, connector, data communication network, or other link. For example, the one or more communication links 414 may comprise a wireless or a wired network, a Local Area Network (LAN), a Wide Area Network (WAN), a private network, a public network (such as the Internet), a WiFi network, a network that includes a satellite link, or another type of data communication network.

A memory or storage device primarily stores one or more software applications or programs, which may also be described as program modules containing computer-executable instructions, which may be executed by the computing unit for implementing one or more embodiments of the present disclosure. The memory, therefore, may include one or more applications 458 including, for example, a transmitter control application 458, a receiver control application 458, and one or more applications 458 enabling one or more of the processes or sub-processes illustrated in FIGS. 1, 3, 4, 6, 7, 8, 9, and 10 and the figures' corresponding descriptions. The applications 458 may produce outputs like those shown in FIGS. 2A, 2B, 3, 8, and 9. These applications 458 may integrate functionality from additional or third-party application programs or from system files stored in memory or on a storage device. An application 458 may perform one or more of the steps in FIGS. 1, 3, 4, 6, 7, 8, 9, and 10 and the figures' corresponding descriptions. System files, such as an ASCII text file, may be used to store the instructions, data input, or both for the applications as may be required in, for example, one or more steps of FIGS. 1, 3, 4, 6, 7, 8, 9, and 10 and the figures' corresponding descriptions. In certain embodiments, any one or more other applications 458 may be used in combination. In certain embodiments, any one or more other applications may be used in combination may be used as stand-alone applications 458.

Although the computing device 400 is shown as having one or more generalized memories, the computing device 400 typically includes a variety of non-transitory computer readable media. By way of example, and not limitation, non-transitory computer readable media may comprise computer storage media and communication media. The memory may include computer storage media, such as a ROM and RAM in the form of volatile memory, nonvolatile memory, or both. A BIOS containing the basic routines that help to transfer information between elements within the computing unit, such as during start-up, is typically stored in the ROM. RAM typically contains data, program modules, other executable instructions, or any combination thereof that are immediately accessible to, presently being operated on, or both by the processing unit. By way of example, and not limitation, the computing device 400 may include an operating system, application programs 458, other program modules, and program data 454.

The components shown in the memory may also be included in other removable/non-removable, volatile/non-volatile non-transitory computer storage media or the components may be implemented in the computing device 400 through an application program interface ("API") or cloud computing, which may reside on a separate computing device coupled through a computer system or network (not shown). For example and without limitation, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that may be used in the exemplary operating environment may include, but are not limited to, magnetic tape cassettes, flash memory cards, digital versatile disks, digital video tape, solid state RAM, solid state ROM, or the like. The drives and their associated computer storage media discussed above provide storage of computer readable instructions, data structures, program modules, and other data for the computing unit.

The computing device 400 may receive commands or information from a user through one or more input devices such as the keyboard 409 and the mouse 410. Additional input devices may comprise a microphone, joystick, touchscreen, scanner, voice or gesture recognition, one or more sensors including one or more seismic sensors, and the like (not shown). These and other input devices may be coupled to the processing unit through the Super I/O chip 408 that is coupled to the ICH 405, but may be coupled by other interface and bus structures, such as a parallel port or a universal serial bus (USB) (not shown).

A monitor or other type of display device (not shown) may be coupled to the MCH 402 via an interface, such as the GPU 404 or via Super I/O chip 408. A graphical user interface ("GUI") may also be used with the video interface 404 to receive instructions from a user and transmit instructions to the central processing unit 401. A GUI may be used to display process outputs, including and without limitation the processes described in FIGS. 2A, 2B, 3, 8, and 9, and may be used to prompt or display modification of subsurface operations or production activities. The computing device 400 may comprise peripheral output devices such as speakers, printer, external memory, any other device, or any combination thereof, which may be coupled through any output peripheral interface.

Any one or more input/output devices may receive and transmit data in analog or digital form over one or more communication links 414 such as a serial link, a wireless link (for example, infrared, radio frequency, or others), a parallel link, or another type of link. The one or more communication links 414 may comprise any type of communication channel, connector, data communication network, or other link. For example, the one or more communication links 414 may comprise a wireless or a wired network, a Local Area Network (LAN), a Wide Area Network (WAN), a private network, a public network (such as the Internet), a wireless fidelity or WiFi network, a network that includes a satellite link, or another type of data communication network.

Although many other internal components of the computing device 400 are not shown, those of ordinary skill in the art will appreciate that such components and their interconnection are well known.

Any one or more embodiments of the present disclosure may be implemented through a computer-executable program of instructions, such as program modules, generally referred to as software applications or application programs executed by a computer. A software application may include, for example, routines, programs, objects, components, data structures, any other executable instructions, or any combination thereof, that perform particular tasks or implement particular abstract data types. The software application forms an interface to allow a computer to react according to a source of input. For example, an interface application may be used to implement any one or more embodiments of the present disclosure. The software application may also cooperate with other applications or code segments to initiate a variety of tasks based, at least in part, on data received, a source of data, or any combination thereof. Other applications or code segments may provide optimization components including, but not limited to, neural networks, earth modeling, history-matching, optimization, visualization, data management, and economics. The software application may be stored, carried, or both on any variety of memory such as CD-ROM, magnetic disk, optical disk, bubble memory, and semiconductor memory (for example, various types of RAM or ROM). Furthermore, the software application and one or more inputs or outputs may be transmitted over a variety of carrier media including, but not limited to wireless, wired, optical fiber, metallic wire, telemetry, any one or more networks (such as the Internet), or any combination thereof.

Moreover, those skilled in the art will appreciate that one or more of the embodiments may comprise a variety of computer-system configurations, including hand-held devices, multiprocessor systems, microprocessor-based or programmable consumer electronics, minicomputers, mainframe computers, and any combination thereof. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may, therefore, be implemented in connection with various hardware, software, or any combination thereof, in a computer system, information handling system, or other processing system.

Though many of the above embodiments pertain to one or more of measurement or calculation of impedance, it should be understood that the measurement or calculation of any acoustic property (for example and without limitation, acoustic impedance, signal attenuation, or the speed of sound in one or more media) through the methods disclosed herein falls within the scope of the present disclosure.

An embodiment of the present disclosure is a method for calculating a value of an acoustic property comprising: emitting a ray into one or more media; receiving a first signal corresponding to the ray at a first point; encoding a first matrix based at least in part on one or more of a location of the first point, a direction of the ray at the first point, and a first perturbation effect; receiving a second signal corresponding to the ray at a second point; encoding a second matrix based at least in part on one or more of a location of the second point, a direction of the ray at the second point, and a second perturbation effect; and calculating the value of the acoustic property of one or more media based at least in part on a comparison between the first matrix and the second matrix.

In certain embodiments discussed in the preceding paragraph, the first perturbation effect and the second perturbation effect may be the same effect. In certain of the preceding embodiments, one or more of the first perturbation effect and the second perturbation effect may comprise a geometric abnormality of a tubular object, and the geometric abnormality may comprise one or more of a variation of the tubular object's thickness, a variation of the tubular object's diameter, a curvature of the tubular object, and an eccentricity of a detector with respect to the tubular object. In certain of the preceding embodiments, one or more of the variation of the tubular object's thickness and the curvature of the tubular object may be assumed to be symmetrical. In certain of the preceding embodiments, one or more of the first perturbation effect and the second perturbation effect may comprise a wave property, and the wave property may comprise one or more of wave-mode coupling, compressional-wave-to-shear-wave coupling, phase, constructive interference, destructive interference, dispersion, energy magnitude, wavelength, and reflectivity. In certain of the preceding embodiments, the first perturbation effect may be three-dimensional, the second perturbation effect may be three-dimensional, and one or more of the first perturbation effect and the second perturbation effect may be used to calculate the value of the acoustic property by incorporating one or more of the first perturbation effect and the second perturbation effect into a one-dimensional model. In certain of the preceding embodiments, calculation of the value of the acoustic property may be completed in real time. In certain of the preceding embodiments, one or more of a material of the one or more media and an integrity of the one or more media may be determined based at least in part on the value of the acoustic property. In certain of the preceding embodiments, the one or more media may comprise a subsurface formation. In certain of the preceding embodiments, the acoustic property may be one or more of an acoustic impedance, a speed of sound in the one or more media, or a signal attenuation.

Another embodiment of the present disclosure is a method for calculating a value of an acoustic property comprising: receiving a first signal at a first point; encoding a first matrix based at least in part on one or more of a location of the first point, a direction of the first signal received at the first point, and a first perturbation effect; receiving a second signal at a second point; encoding a second matrix based at least in part on one or more of a location of the second point, a direction of the second signal received at the second point, and a second perturbation effect; calculating a first value of the acoustic property based at least in part on a comparison between the first matrix and the second matrix; measuring a second value of the acoustic property; encoding a difference between the first value of the acoustic property and the second value of the acoustic property into a third matrix; receiving a third signal at a third point; encoding into a fourth matrix one or more of a location of the third point, a direction of the third signal received at the third point, and a third perturbation effect; receiving a fourth signal at a fourth point; encoding a fifth matrix based at least in part on a location of the fourth point, a direction of the fourth signal received at the fourth point, and a fourth perturbation effect; and calculating a third value of the acoustic property based at least in part on a comparison between one or more of the third matrix, the fourth matrix, and the fifth matrix.

In certain embodiments discussed in the preceding paragraph, one or more of the first value of the acoustic property, the second value of the acoustic property, and the third value of the acoustic property may be an impedance value. In certain of the preceding embodiments, a collection of forward-modeled solutions may be generated and matched in real time. In certain of the preceding embodiments, the first value of the acoustic property may be calculated and the second value of the acoustic property may be measured simultaneously. In certain of the preceding embodiments, one or more of the first perturbation effect, the second perturbation effect, the third perturbation effect, or the fourth perturbation effect may comprise a geometric abnormality of a tubular object, and the geometric abnormality may comprise one or more of a variation of the tubular object's thickness, a variation of the tubular object's diameter, a curvature of the tubular object, and an eccentricity of a detector with respect to the tubular object.

Another embodiment of the present disclosure is a system for calculating a value of an acoustic property, comprising: an energy emitter; a receiver; a tubular object within one or more media; and an information handling system coupled to one or more of the energy emitter and the energy receiver, the information handling system comprising: a processor; and a non-transitory computer readable medium for storing one or more instructions that, when executed, causes the processor to: prompt the energy emitter to produce a ray; receive at the receiver a first signal corresponding to the ray at a first point; encode a first matrix based on one or more of a location of the first point, a direction of the first ray at the first point, and a first perturbation effect; receive at the receiver a second signal corresponding to the ray at a second point; encode a second matrix based at least in part on one or more of a location of the second point, a direction of the first ray at the second point, and a second perturbation effect; and calculate the value of the acoustic property of the one or more media based at least in part on a comparison between the first matrix and the second matrix.

In certain embodiments discussed in the preceding paragraph, the tubular object may be an oilwell casing. In certain of the preceding embodiments, the one or more media may comprise a subsurface formation. In certain of the preceding embodiments, the acoustic property may be one or more of an acoustic impedance, a speed of sound in the one or more media, or a signal attenuation. In certain of the preceding embodiments, the energy emitter and the receiver may be coincident.

Therefore, the present disclosure is well adapted to attain the ends and advantages mentioned as well as those that are inherent therein. While the present disclosure has been described in connection with presently preferred embodiments, it will be understood by those skilled in the art that it is not intended to limit the disclosure to those embodiments. It is therefore contemplated that various alternative embodiments and modifications may be made to the disclosed embodiments without departing from the spirit and scope of the disclosure defined by the appended claims and equivalents thereof. In particular, with regards to the methods disclosed, one or more steps may not be required in all embodiments of the methods and the steps disclosed in the methods may be performed in a different order than was described. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (for example, "from about a to about b," or, equivalently, "from approximately a to b," or, equivalently, "from approximately a-b") disclosed herein is to be understood as referring to the power set (the set of all subsets) of the respective range of values. The expression "any one or more of" followed by a collection of elements (for example and without limitation, "one or more of A and B") disclosed herein is to be understood as disjunctive (for example and without limitation, "one or more of A and B" could be satisfied by only A, only B, or both A and B). Furthermore, the words "comprising" (and any form of comprising, such as "comprise" and "comprises"), "having" (and any form of having, such as "has" and "have"), "including" (and any form of including, such as "includes" and "include") or "containing" (and any form of containing, such as "contains" and "contain") are to be understood as inclusive or open-ended and do not exclude additional, unrecited elements or method steps. The terms "transmitter," "transmitters," "transducer," "transducers," "energy emitter," and "energy emitters" should be understood to include any device by which a wave or electrical signal may be emitted. The term "coupled" should be understood to include any connection between two things, including and without limitation a physical connection (including and without limitation a wired connection), a non-physical connection (including and without limitation a wireless connection), or any combination thereof. The term "ray" should be understood to include any unit of energy that may behave in a ray-like or wave-like manner, including and without limitation acoustic waves, ultrasonic waves, electron beams, and any type of photon ray (including and without limitation gamma rays, x-rays, ultraviolet rays, visible light, infrared rays, radar, and microwaves). The terms in the claims have their plain, ordinary meaning unless otherwise explicitly and clearly defined by the patentee.

What is claimed is:

1. A method for determining an acoustic property of one or more media, comprising:

- disposing at least one energy emitter and at least one energy receiver into a wellbore, wherein the at least one energy emitter and the at least one energy receiver:
  - are communicatively coupled to an information handling system configured to control one or more operations of the at least one energy emitter the at least one energy receiver, or both; and
  - allow identification of the acoustic property of the one or more media;

controlling, via the information handling system, the at least one energy emitter to emit an acoustic ray into the one or more media, wherein the one or more media comprises a media of: a casing within the wellbore, a tubular within the wellbore, the formation surrounding the wellbore, a cement surrounding the wellbore, or any combination thereof;

controlling, via the information handling system, the at least one energy receiver to receive a first signal corresponding to the acoustic ray at a first point in the one or more media;

determining, via the information handling system, a value of the acoustic property of the one or more media by:

determining a first set of information based on the first signal;

encoding a first matrix based at least in part on the first set of information, wherein the first set of information comprises one or more of a location of the first point, a direction of the acoustic ray at the first point, or a first wave property;

operating the at least one energy receiver to receive a second signal corresponding to the acoustic ray at a second point;

determining a second set of information based on the second signal;

encoding a second matrix based at least in part on the second set of information, wherein the second set of information comprises one or more of a location of the second point, a direction of the acoustic ray at the second point, or a second wave property;

determining one or more perturbation effects associated with the one of more media based on the first matrix, the second matrix, or both, wherein the one or more perturbation effects comprise (1) one or more wave phenomena associated with the acoustic ray, (2) one or more geometric abnormalities associated with the acoustic ray, (3) one or more geometric abnormalities associated with the one or more media, or any combination thereof;

adjusting, based on the one or more perturbation effects, the first set of information, the second set of information, or both; and determining, based on the adjusted first set of information, the adjusted second set of information, or both, the value of the acoustic property of the one or more media; and determining, via the information handling system, a material, a condition, or both of the one or more media based on the value of the acoustic property.

2. The method of claim 1, wherein the first wave property and the second wave property are of a same type.

3. The method of claim 1, wherein the one or more geometric abnormalities comprise one or more variations of a tubular objection regarding a thickness of the tubular object, a diameter of the tubular object, a curvature of the tubular object, or an eccentricity of a detector with respect to the tubular object.

4. The method of claim 3, wherein the thickness of the tubular object, the curvature of the tubular object, or both are assumed to be symmetrical.

5. The method of claim 1, wherein the geometric abnormalities comprise one or more of wave-mode coupling, compressional-wave-to-shear-wave coupling, phase, constructive interference, destructive interference, dispersion, energy magnitude, wavelength, and reflectivity.

6. The method of claim 1, wherein the one or more perturbation effects comprise a first three-dimensional perturbation effect corresponding to the first matrix and a second three-dimensional perturbation effect corresponding to the second matrix, and wherein one or more of the first perturbation effect and the second perturbation effect is used to determine the value of the acoustic property by incorporating one or more of the first perturbation effect and the second perturbation effect into a one-dimensional model.

7. The method of claim 1, wherein determining the value of the acoustic property is completed in real time.

8. The method of claim 1, wherein the one or more media comprise a subsurface formation.

9. The method of claim 1, wherein the acoustic property is one or more of an acoustic impedance, a speed of sound in the one or more media, or a signal attenuation.

10. A method for determining an acoustic property of one or more media, comprising:

disposing at least one energy emitter and at least one energy receiver into a wellbore, wherein the at least one energy emitter and the at least one energy receiver, are communicatively coupled to an information handling system configured to control one or more operations of the at least one energy emitter, the at least one energy receiver, or both; and allow identification of the acoustic property of the one or more media controlling, via the information handling system, the at least one energy emitter to emit an acoustic ray into the one or more media, wherein the one or more media comprises a media of: a casing within the wellbore, a tubular within the wellbore, the formation surrounding the wellbore, a cement surrounding the wellbore, or any combination thereof;

controlling via the information handling system, at least one energy receiver to receive a first signal corresponding to the acoustic ray at a first point in the one or more media;

determining, via the information handling system, a value of the acoustic property of the one or more media by:

encoding a first matrix based at least in part on a first set of information comprising one or more of a location of the first point, a direction of the first signal received at the first point, or a first wave property;

receiving, at the at least one energy receiver, a second signal corresponding to the acoustic ray at a second point;

encoding a second matrix based at least in part on a second set of information comprising one or more of a location of the second point, a direction of the second signal received at the second point, or a second wave property;

determining a first value of the acoustic property of the one or more media based at least in part on a comparison between the first matrix and the second matrix;

determining a second value of the acoustic property of the one or more media;

encoding a difference between the first value and the second value into a third matrix;

receiving, at the at least one energy receiver, a third signal corresponding to the acoustic ray at a third point;

encoding a fourth matrix based at least in part on a third set of information comprising one or more of a location of the third point, a direction of the third signal received at the third point, or a third wave property;

receiving, at the at least one energy receiver, a fourth signal corresponding to the acoustic ray at a fourth point;

encoding a fifth matrix based at least in part on a fourth set of information comprising one or more of a location of the fourth point, a direction of the fourth signal received at the fourth point, or a fourth wave property;

determining one or more perturbation effects associated with the one or more media based on one or more of the first, second, third, fourth, or fifth matrix, wherein the one or more perturbation effects comprise (1) one or more wave phenomena associated with the acoustic ray, (2) one or more geometric abnormalities associated with the acoustic ray, (3) one or more geometric abnormalities associated with the one or more media, or any combination thereof;

based on the one or more perturbation effects, adjusting the first set of information, the second set of information, the third set of information, the fourth set of information, or any combination thereof; and determining, based on one or more of the adjusted first set of information, the adjusted second set of information, the adjusted third set of information, or the adjusted fourth set of information, a third value of the acoustic property of the one or more media; and determining, via the information handling system, a material, a condition, or both of the one or more media based on the third value of the acoustic property.

11. The method of claim 10, wherein one or more of the first value of the acoustic property, the second value of the acoustic property, and the third value of the acoustic property is an impedance value.

12. The method of claim 10, wherein a collection of forward-modeled solutions is generated and matched in real time.

13. The method of claim 10, wherein the first value of the acoustic property is determine via one or more calculations, and wherein the second value of the acoustic property is determined via one or more measurements, wherein the one or more calculations and the one or more measurements are performed simultaneously.

14. The method of claim 10, wherein the one or more geometric abnormalities comprises one or more variations of a tubular object regarding the tubular object's thickness, the tubular object's diameter, a curvature of the tubular object, or an eccentricity of a detector with respect to the tubular object.

15. A system for determining an acoustic property of one or more media, comprising: an energy emitter; an energy receiver, wherein the energy emitter and the energy receiver allow identification of the acoustic property of the one or more media, wherein the one or more media comprises a media of: a casing within the wellbore, a tubular within the wellbore, a formation surrounding the wellbore, a cement surrounding the wellbore, or any combination thereof; a tubular object within the one or more media; and an information handling system coupled to and configured to control one or more of the energy emitter and the energy receiver, the information handling system comprising: a processor; and a non-transitory computer readable medium for storing one or more instructions that, when executed, causes the processor to: operate the energy emitter to produce an acoustic ray in the one or more media; operate the energy receiver to receive a first signal corresponding to the acoustic ray at a first point in the one or more media; determine a value of the acoustic property of the one or more media by: determining a first set of information based on the first signal; encoding a first matrix based on, at least in part, the first set of information, wherein the first set of information comprises one or more of a location of the first point, a direction of the acoustic ray at the first point, or a first wave property; receiving a second signal corresponding to the acoustic ray at a second point; determining a second set of information based on the second signal; encoding a second matrix based on, at least in part, the second set of information, wherein the second set of information comprises one or more of a location of the second point, a direction of the acoustic ray at the second point, or a second wave property; determining one or more perturbation effects associated with the one or more media based on the first matrix the second matrix, or both, wherein the one or more perturbation effects comprise (1) one or more wave phenomena associated with the acoustic ray, (2) one or more geometric abnormalities associated with the acoustic ray, (3) one or more geometric abnormalities associated with the one or more media, or any combination thereof; based on the one or more perturbation effects, adjusting the first set of information, the second set of information, or both; and determine, based on the adjusted first set of information, the adjusted second set of information, or both, the value of the acoustic property of the one or more media; and determine a material, a condition, or both of the one or more media based on the value of the acoustic property.

16. The system of claim 15, wherein the one or more media comprises a media of the tubular object.

17. The system of claim 15, wherein the one or more media comprises a media of a subsurface formation.

18. The system of claim 15, wherein the acoustic property is one or more of an acoustic impedance, a speed of sound in the one or more media, or a signal attenuation.

19. A system for determining an acoustic property of one or more media, comprising: an energy emitter; an energy receiver, wherein the energy emitter and the energy receiver allow identification of the acoustic property of the one or more media, wherein the one or more media comprises a media of: a casing within the wellbore, a tubular within the wellbore, a formation surrounding the wellbore, a cement surrounding the wellbore, or any combination thereof; a tubular object within the one or more media; and an information handling system coupled to and configured to control one or more of the energy emitter and the energy receiver, the information handling system comprising: a processor, programmed to determine a value of the acoustic property of the one or more media by; operate the energy emitter to produce an acoustic ray into the one or more media; operate the energy receiver to receive a first signal corresponding to the acoustic ray at a first point in the one or more media; encode a first matrix based on one or more of a first plurality of wave properties, a location of the first point, or a direction of the acoustic ray at the first point; operate the energy receiver to receive a second signal corresponding to the acoustic ray at a second point; encode a second matrix based on one or more of a second plurality of wave properties, a location of the second point, or a direction of the acoustic ray at the second point; determining one or more perturbation effects associated with the one or more media based on the first matrix, the second matrix, or both, wherein the one or more perturbation effects comprise (1) one or more wave phenomena associated with the acoustic ray, (2) one or more geometric abnormalities associated with the acoustic ray, (3) one or more geometric abnormalities associated with the one or more media, or any combination thereof; adjusting, based on the one or more perturbation effects, the first matrix, the second matrix, or both; and determine, based on the adjusted first matrix, the adjusted second matrix, or both, the value of the acoustic property of the one or more media; and determine a material, a condition, or both of the one or more media based on the value of the acoustic property.

20. The system of claim 16, wherein the tubular object is an oilwell casing.

* * * * *